US008905551B1

(12) United States Patent
Worley, III

(10) Patent No.: US 8,905,551 B1
(45) Date of Patent: *Dec. 9, 2014

(54) UNPOWERED AUGMENTED REALITY PROJECTION ACCESSORY DISPLAY DEVICE

(75) Inventor: William Spencer Worley, III, Half Moon Bay, CA (US)

(73) Assignee: Rawles LLC, Wilmington, DE (US)

( * ) Notice: Subject to any disclaimer, the term of this patent is extended or adjusted under 35 U.S.C. 154(b) by 991 days.

This patent is subject to a terminal disclaimer.

(21) Appl. No.: 12/977,992

(22) Filed: Dec. 23, 2010

(51) Int. Cl.
*G03B 21/14* (2006.01)

(52) U.S. Cl.
USPC .................. 353/79; 353/15; 353/30; 353/69; 353/70; 353/122; 382/284; 382/392

(58) Field of Classification Search
USPC ........... 353/10, 15, 28, 30–31, 69–70, 79, 98, 353/122; 348/333.01, 173, 564, 190, 744, 348/747, E05.099, E05.022; 715/863, 767, 715/773, 810, 839; 382/154, 181, 284, 292; 349/5, 7–9, 11
See application file for complete search history.

(56) References Cited

U.S. PATENT DOCUMENTS

| 3,835,245 | A | 9/1974 | Pieters |
| 3,840,699 | A | 10/1974 | Bowerman |
| 4,112,463 | A | 9/1978 | Kamin |
| 5,704,836 | A | 1/1998 | Norton et al. |
| 6,503,195 | B1 | 1/2003 | Keller et al. |
| 6,618,076 | B1 | 9/2003 | Sukthankar et al. |
| 6,690,618 | B2 | 2/2004 | Tomasi et al. |
| 6,760,045 | B1 | 7/2004 | Quinn et al. |
| 6,789,903 | B2 | 9/2004 | Parker et al. |
| 6,803,928 | B2 | 10/2004 | Bimber et al. |
| 6,811,267 | B1 | 11/2004 | Allen et al. |
| 7,046,214 | B2 | 5/2006 | Ebersole, Jr. et al. |
| 7,315,241 | B1 | 1/2008 | Daily et al. |
| 7,418,392 | B1 | 8/2008 | Mozer et al. |
| 7,538,764 | B2 | 5/2009 | Salomie |
| 7,720,683 | B1 | 5/2010 | Vermeulen et al. |
| 7,743,348 | B2 * | 6/2010 | Robbins et al. ............... 715/863 |
| 7,774,204 | B2 | 8/2010 | Mozer et al. |
| 7,911,444 | B2 | 3/2011 | Yee |
| 7,925,996 | B2 * | 4/2011 | Hofmeister et al. .......... 715/863 |

(Continued)

FOREIGN PATENT DOCUMENTS

| WO | WO2009112585 | | 9/2009 |
| WO | WO2011088053 A2 | | 7/2011 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

(Continued)

*Primary Examiner* — Sultan Chowdhury
(74) *Attorney, Agent, or Firm* — Lee & Hayes, PLLC

(57) ABSTRACT

An augmented reality system may generate an augmented reality environment by projecting images onto various surfaces within a scene. A projection accessory display device (PADD) provides known characteristics for projection, and may be configured to simplify generation and maintenance of the projected image upon the PADD. The PADD may also provide one or more input devices which accept input from a user within the augmented reality environment. The PADD may comprise non-electronic passive components, electronic active components, or a combination thereof.

29 Claims, 27 Drawing Sheets

(56) References Cited

U.S. PATENT DOCUMENTS

| | | | |
|---|---|---|---|
| 7,949,148 B2* | 5/2011 | Rhoads et al. | 382/100 |
| 8,107,736 B2 | 1/2012 | Brown et al. | |
| 8,159,739 B2 | 4/2012 | Woodgate et al. | |
| 8,199,966 B2 | 6/2012 | Guven et al. | |
| 8,253,746 B2 | 8/2012 | Geisner et al. | |
| 8,264,536 B2 | 9/2012 | McEldowney | |
| 8,284,205 B2 | 10/2012 | Miller et al. | |
| 8,285,256 B2 | 10/2012 | Gupta et al. | |
| 8,307,388 B2 | 11/2012 | Igoe et al. | |
| 8,308,304 B2 | 11/2012 | Jung et al. | |
| 8,382,295 B1 | 2/2013 | Kim et al. | |
| 8,408,720 B2 | 4/2013 | Nishigaki et al. | |
| 8,591,039 B2 | 11/2013 | Morrison et al. | |
| 2002/0001044 A1 | 1/2002 | Villamide | |
| 2002/0070278 A1 | 6/2002 | Hung et al. | |
| 2004/0046736 A1 | 3/2004 | Pryor et al. | |
| 2004/0201823 A1* | 10/2004 | Raskar et al. | 353/69 |
| 2005/0081164 A1* | 4/2005 | Hama et al. | 715/830 |
| 2005/0110964 A1 | 5/2005 | Bell et al. | |
| 2005/0128196 A1 | 6/2005 | Popescu et al. | |
| 2005/0254683 A1 | 11/2005 | Schumann et al. | |
| 2005/0264555 A1 | 12/2005 | Zhou et al. | |
| 2005/0276444 A1 | 12/2005 | Zhou et al. | |
| 2005/0288078 A1 | 12/2005 | Cheok et al. | |
| 2005/0289590 A1 | 12/2005 | Cheok et al. | |
| 2006/0028400 A1 | 2/2006 | Lapstun et al. | |
| 2006/0041926 A1 | 2/2006 | Istvan et al. | |
| 2006/0080408 A1 | 4/2006 | Istvan et al. | |
| 2006/0152803 A1 | 7/2006 | Provitola | |
| 2006/0170880 A1 | 8/2006 | Dambach et al. | |
| 2006/0262140 A1 | 11/2006 | Kujawa et al. | |
| 2007/0005747 A1 | 1/2007 | Batni et al. | |
| 2007/0024644 A1 | 2/2007 | Bailey | |
| 2007/0239211 A1 | 10/2007 | Lorincz et al. | |
| 2008/0094588 A1 | 4/2008 | Cole et al. | |
| 2008/0174735 A1* | 7/2008 | Quach et al. | 353/15 |
| 2008/0180640 A1 | 7/2008 | Ito | |
| 2008/0186255 A1 | 8/2008 | Cohen et al. | |
| 2008/0273754 A1 | 11/2008 | Hick et al. | |
| 2009/0066805 A1 | 3/2009 | Fujiwara et al. | |
| 2009/0073034 A1 | 3/2009 | Lin | |
| 2010/0011637 A1 | 1/2010 | Zhang | |
| 2010/0026479 A1 | 2/2010 | Tran | |
| 2010/0066676 A1 | 3/2010 | Kramer et al. | |
| 2010/0164990 A1 | 7/2010 | Van Doorn | |
| 2010/0199232 A1 | 8/2010 | Mistry et al. | |
| 2010/0207872 A1 | 8/2010 | Chen et al. | |
| 2010/0257252 A1 | 10/2010 | Dougherty et al. | |
| 2010/0284055 A1 | 11/2010 | Kothari et al. | |
| 2011/0012925 A1 | 1/2011 | Luo | |
| 2011/0061100 A1 | 3/2011 | Mattila et al. | |
| 2011/0072047 A1 | 3/2011 | Wang et al. | |
| 2011/0093094 A1 | 4/2011 | Goyal et al. | |
| 2011/0096844 A1 | 4/2011 | Poupel et al. | |
| 2011/0134204 A1 | 6/2011 | Rodriguez et al. | |
| 2011/0161912 A1 | 6/2011 | Eteminan et al. | |
| 2011/0164163 A1* | 7/2011 | Bilbrey et al. | 348/333.01 |
| 2011/0197147 A1* | 8/2011 | Fai | 715/753 |
| 2011/0216090 A1 | 9/2011 | Woo et al. | |
| 2011/0238751 A1 | 9/2011 | Belimpasakis et al. | |
| 2011/0249197 A1* | 10/2011 | Sprowl et al. | 348/744 |
| 2012/0009874 A1 | 1/2012 | Kiukkonen et al. | |
| 2012/0120296 A1 | 5/2012 | Roberts et al. | |
| 2012/0127320 A1* | 5/2012 | Balogh | 348/180 |
| 2012/0130513 A1 | 5/2012 | Hao et al. | |
| 2012/0223885 A1 | 9/2012 | Perez | |
| 2013/0235354 A1 | 9/2013 | Kilcher et al. | |
| 2013/0300637 A1 | 11/2013 | Smits et al. | |

OTHER PUBLICATIONS

Office action for U.S. Appl. No. 12/982,519, mailed on Feb. 7, 2013, Worley III , "Complementing Operation of Display Devices in an Augmented Reality Environment", 13 pages.

Office Action for U.S. Appl. No. 12/977,949, mailed on Jan. 22, 2014, William Spencer Worley III, "Powered Augmented Reality Projection Accessory Display Device", 11 pages.

Office action for U.S. Appl. No. 12/977,924, mailed on Nov. 15, 2013, Coley, et al., "Characterization of a Scene With Structured Light", 9 pages.

Office Action for U.S. Appl. No. 13/236,294, mailed on Nov. 7, 2013, Christopher Coley, "Optical Interference Mitigation", 12 pages.

Office Action for U.S. Appl. No. 12/982,457, mailed on Dec. 3, 2013, William Spencer Worley III, "Utilizing Content Output Devices in an Augmented Reality Environment", 56 pages.

Office Action for U.S. Appl. No. 12/978,800, mailed on Oct. 25, 2013, William Spencer Worley III, "Integrated Augmented Reality Environment", 36 pages.

Office action for U.S. Appl. No. 12/977,760, mailed on Jun. 4, 2013, Worley III et al., "Generation and Modulation of Non-Visible Structured Light", 12 pages.

Office action for U.S. Appl. No. 12/982,519, mailed on Aug. 29, 2013, Worley III, "Complementing Operation of Display Devices in an Augmented Reality Environment", 12 pages.

Sneath, "The Bumper List of Windows 7 Secrets", retrieved on Aug. 21, 2013, at http://blogs.msdn.com/b/tims/archive/2009/01/12/ the bumper-list-of-windows-7-secrets.aspx., 2009, 13 pages.

Office action for U.S. Appl. No. 12/977,760, mailed on Oct. 15, 2012, Worley III et al., "Generation and Modulation of Non-Visible Structured Light", 13 pages.

Office Action for U.S. Appl. No. 12/982,519, mailed on Feb. 12, 2014, William Spencer Worley III, "Complementing Operation of Display Devices in an Augmented Reality Environment", 12 pages.

Final Office Action for U.S. Appl. No. 13/236,294, mailed on Mar. 13, 2014, Christopher Coley, "Optical Interference Mitigation", 14 pages.

Office Action for U.S. Appl. No. 12/975,175, mailed on Apr. 10, 2014, William Spencer Worley III, "Designation of Zones of Interest Within an Augmented Reality Environment", 33 pages.

Final Office Action for U.S. Appl. No. 12/982,457, mailed on May 8, 2014, William Spencer Worley III, "Utilizing Content Output Devices in an Augmented Reality Environment", 58 pages.

Office Action for U.S. Appl. No. 12/978,800, mailed on Jun. 17, 2014, Worley III, "Integrated Augmented Reality Environment", 40 pages.

* cited by examiner

UNPOWERED AUGMENTED REALITY PROJECTION ACCESSORY DISPLAY DEVICE

BACKGROUND

Augmented reality allows interaction among users, real-world objects, and virtual or computer-generated objects and information within an augmented reality environment. Within the augmented reality environment images may be presented on various objects. However, maintaining images on these objects, receiving input from a user's interaction with these objects, and so forth may be impractical in some situations. What is desired are devices suited for presenting the virtual objects to the user and for accepting input from the user in the augmented reality environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
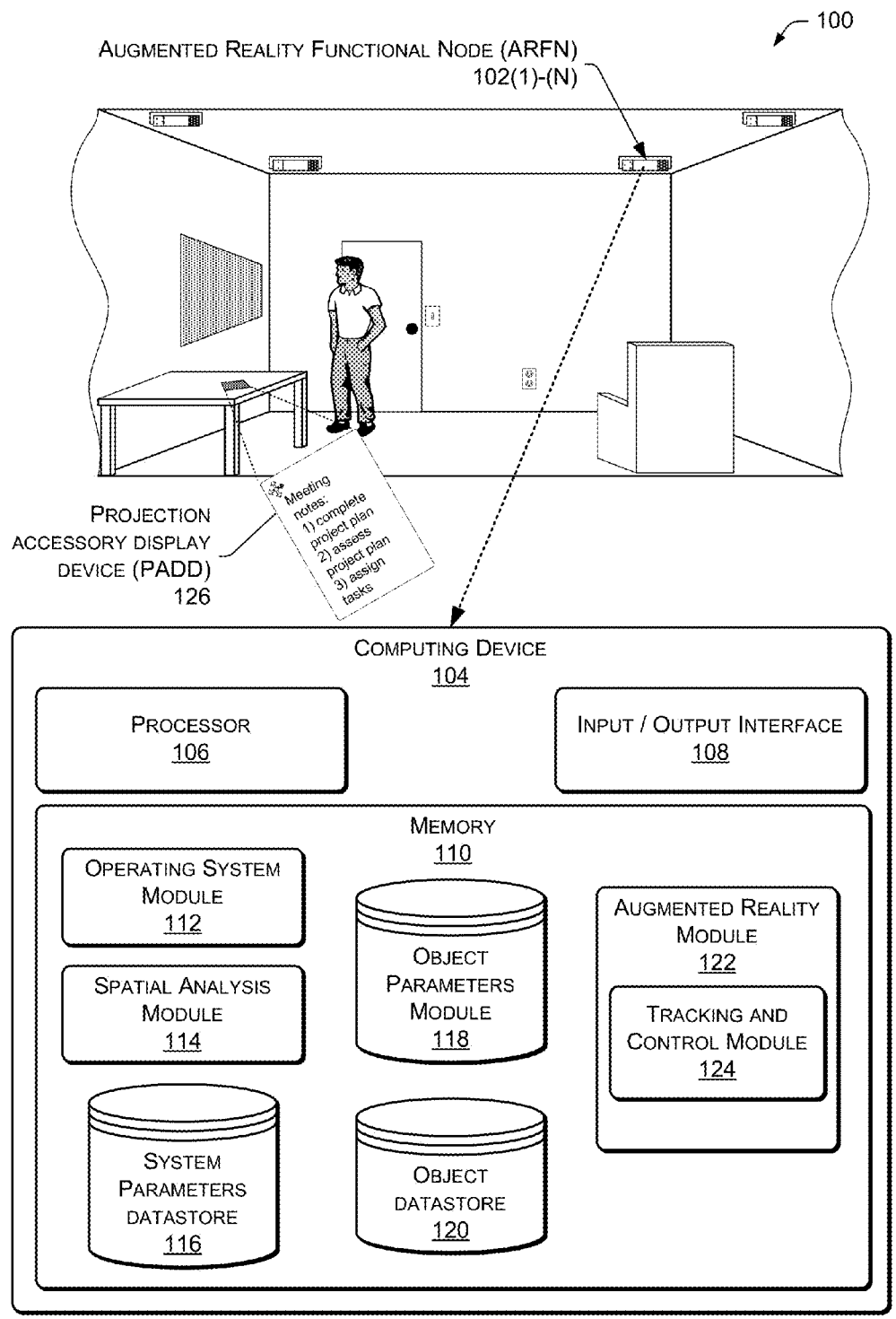
FIG. 1 shows an illustrative scene with an augmented reality environment set in an exemplary room. The augmented reality environment is provided, in part, by an augmented reality functional node (ARFN) located in the scene. A projection accessory display device (PADD) configured to interact with the ARFN is also shown in this scene.

Augmented reality environments may use projectors to project images onto physical surfaces. Described herein is a projection accessory display device (PADD) suitable for use within an augmented reality environment. The PADD may be provided in several form factors, including a tablet, coaster, placemat, tablecloth, countertop, tabletop, and so forth.

A projection surface on the PADD facilitates presentation of an image generated by an image projector. The image projector may be part of an augmented reality functional node (ARFN). One or more ARFNs may be distributed within a scene, such as a room, and are used to maintain the augmented reality environment. The ARFNs may comprise input devices such as cameras, output devices such as the projectors, computing devices, and so forth.

Within the augmented reality environment, information is projected onto the projection surface for consumption by the user. Where the PADD is moveable, such as in a tablet form factor, the ARFN is configured to track the PADD and maintain the presentation of the information on the tablet. In some implementations, the PADD may be immovable such as a countertop or affixed to or incorporated into a relatively fixed item such as a tabletop.

Tracking and presentation of an image upon the PADD may be facilitated when a relative angle between the projector and the projection surface on the PADD is maintained within a pre-determined preferential angular range. For example, computational and optical complexity to maintain an image on the PADD may be reduced when an angle of projection is within 30 degrees of a perpendicular of the projection surface. Furthermore, within the preferential angular range image quality is maintained such that a desired number of pixels per square inch are presented.

Just as a user will orient a book to obtain a good image for reading, so too may a user be encouraged to orient the PADD to maintain this preferential range. This encouragement may be provided via passive or active mechanisms. In a passive mechanism, the projection surface is configured to provide visual feedback as to a relative angle between the projection surface and the projector. This visual feedback may be bands, arrows, images, or other visual indicia that manifest as a result of a variation in reflectance, overall brightness, or both with angle.

Visual feedback may also be provided using an active component, such as alignment indicators. These alignment indicators may be lights which indicate a direction along which the user should manipulate the PADD to maintain the preferential angular range.

The projection surface of the PADD may also incorporate a watermark. Watermarks are features or markings with optical characteristics configured to be scanned by the augmented reality system, such as by the camera of the ARFN. Watermarks may be scanned using visible or non-visible wavelengths. By scanning the watermark, the ARFN may determine orientation, identify user input gestures, and so forth.

The PADD may utilize passive or non-electric components to facilitate user interaction with the ARFN. The interactions may include accepting user inputs such as the activation of non-electronic buttons. The non-electronic buttons are configured to generate a signal upon activation which the ARFN is configured to receive. For example, pushing a button may generate an ultrasonic sound which is detected by the ARFN. The passive components do not require electrical power, and may be mechanical in nature, such as a mechanical button displacing a tuning fork to generate ultrasonic sound.

Passive optical tracking targets may be provided which aid the ARFN in determining an orientation of the PADD in the environment. The PADD may also have an optical tag, such as a barcode, allowing the ARFN to identify a particular PADD.

The PADD may additionally, or alternatively, utilize active components which require electricity to operate. These active components may include power handling, input functionality, output functionality, communication, and processing components. These active components provide additional functionality to the PADD, such as communicating directionally with the ARFN, accepting user inputs, generating haptic output, and so forth. The user inputs may include touches, button activations, biomedical telemetry, biometric information, and so forth.

The power used to operate the active components may be stored on the PADD in the form of a battery, or transmitted from the augmented reality environment. For example, the active components in the PADD may be powered by a photoelectric array configured to produce power at least in part from incident light from the projector within the ARFN.

The active components may also be used to enhance tracking and orientation determination of the PADD. For example, active orientation beacons within the PADD may generate signals which the ARFN is configured to receive and interpret.

As can be appreciated, there are many different configurations possible for the PADD, including PADDs exclusively formed of one or more passive components, PADDs exclusively formed of one or more active components, or PADDs formed of a combination of active and passive components. The following discussion describes several possible implementations for illustration, but other configurations may be available.

Illustrative Environment

FIG. 1 shows an illustrative augmented reality environment 100 which includes an augmented reality functional node (ARFN) 102 with associated computing device 104. In this illustration, a plurality of ARFNs 102 are positioned around the scene, in this case a room. In other implementations, a single ARFN 102 may be used and disposed on the ceiling, as a lamp, and so forth.

The ARFN 102 is coupled to the computing device 104. This computing device may be within the ARFN 102, or disposed at another location and coupled to the ARFN 102 via a wired or wireless network. The computing device 104 comprises a processor 106, an input/output interface 108, and a memory 110. The processor 106 may comprise one or more processors configured to execute instructions. The instructions may be stored in memory 110, or in other memory accessible to the processor 106 such as storage in the cloud.

The input/output interface 108 may be configured to couple the computing device 104 to other components, such as projector, cameras, microphones, other ARFNs 102, other computing devices, and so forth. The coupling between the computing device 104 and the components may be via wire, fiber optic cable, wireless, or other connections.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instruction, datastores, and so forth may be stored within the memory 110 and configured to execute on a processor, such as the processor 106. An operating system module 112 is configured to manage hardware and services within and coupled to the computing device 104 for the benefit of other modules.

A spatial analysis module 114 is configured to perform several functions which may include analyzing a scene to generate a topology, recognizing objects in the scene, dimensioning the objects, and modeling the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, the examples in this disclosure refer to structured light. The spatial analysis module 114 provides the information used within the augmented reality environment to provide an interface between the physicality of the scene and virtual objects and information.

A system parameters datastore 116 is configured to maintain information about the state of the computing device 104, the input/output devices of the ARFN 102, and so forth. For example, system parameters may include current pan and tilt settings of the cameras and projectors. As used in this disclosure, datastore includes lists, arrays, databases, and other data structures used to provide storage and retrieval of data.

An object parameters datastore 118 in the memory 110 is configured to maintain information about the state of objects within the scene. The object parameters may include the surface contour of the object, overall reflectivity, color, and so forth. This information may be acquired from the ARFN 102, other input devices, or via manual input and stored within the object parameters datastore 118.

An object datastore 120 is configured to maintain a library of pre-loaded reference objects. This information may include assumptions about the object, dimensions, and so forth. For example, the object datastore 120 may include a reference object of a beverage can and include the assumptions that beverage cans are either held by a user or sit on a surface, and are not present on walls or ceilings. The spatial analysis module 114 may use this data maintained in the datastore 120 to test dimensional assumptions when determining the dimensions of objects within the scene. Known dimensions of the PADD 126 may also be used for testing dimensional assumptions of objects within the scene. In some implementations the object parameters in the object parameters datastore 118 may be incorporated into the object datastore 120. For example, objects in the scene which are temporally persistent, such as walls, a particular table, particular users, and so forth may be stored within the object datastore 120. The object datastore 120 may be stored on one or more of the memory of the ARFN 102, storage devices accessible on the local network, or cloud storage accessible via a wide area network.

An augmented reality module 122 is configured to generate augmented reality output in concert with the physical environment. The augmented reality module 122 includes a tracking and control module 124 configured to track one or more projection accessory display devices (PADD) 126 within the scene and accept inputs from or relating to the PADDs 126. For example, as shown here, an image of notes from a meeting may be projected on the projection surface of the PADD 126 and track with the PADD 126 as the user picks up the PADD 126 and moves it around the scene. While the PADD 126 is moved around the room, the image of the notes tracks with the movement of the PADD 126 such that the notes remain projected on the PADD's 126 projection surface.

Control inputs such as gestures relative to the PADD 126, activation of buttons on the PADD, and so forth may be received by the sensors on the ARFN and interpreted by the tracking and control module 124. Various implementations of the PADD 126 are discussed below with regards to FIGS. 6-27. The augmented reality module 122 may access input/output devices within one or more ARFNs 102 to generate output and receive input.

Figure 2:
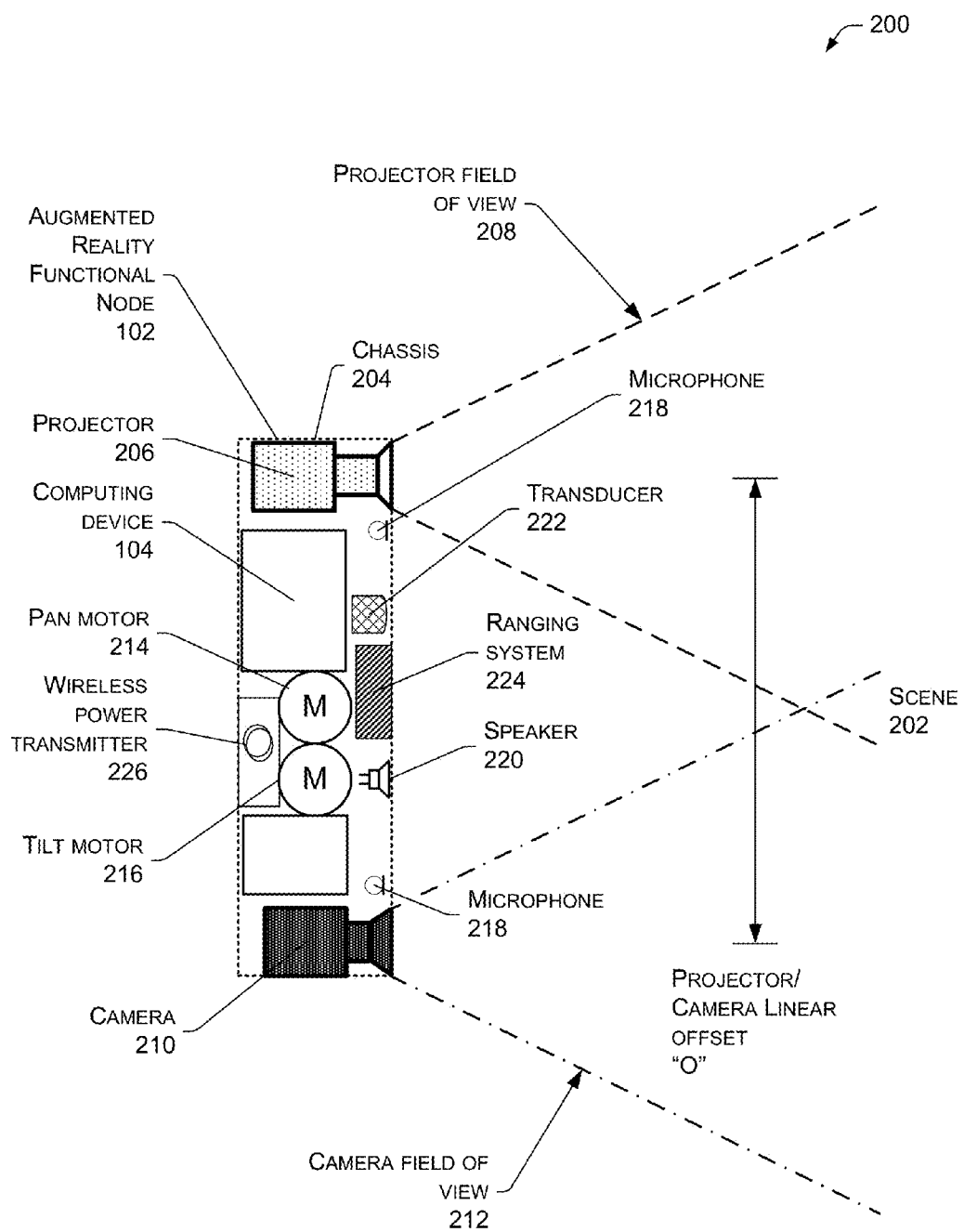
FIG. 2 shows an illustrative augmented reality functional node and selected computing device, along with other selected components.

FIG. 2 shows an illustrative schematic 200 of the augmented reality functional node 102 and selected components. The ARFN 102 is configured to scan at least a portion of a scene 202 and the objects therein. The ARFN 102 may also be configured to provide augmented reality output, such as images, sounds, and so forth.

A chassis 204 holds the components of the ARFN 102. Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used.

A camera 210 may also be disposed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment.

One or more speakers 220 may also be present to provide for audible output. For example, the speakers 220 may be used to provide output from a text-to-speech module or to playback pre-recorded audio.

A transducer 222 may be present within the ARFN 102, or elsewhere within the environment, and configured to detect and/or generate inaudible signals, such as infrasound or ultrasound. These inaudible signals may be used to provide for signaling between accessory devices and the ARFN 102.

A ranging system 224 may also be provided in the ARFN 102. The ranging system 224 is configured to provide distance information from the ARFN 102 to a scanned object or set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components within the PADD 126. The wireless power transmitter 226 may utilize inductive coupling, resonant coupling, capacitive coupling, and so forth.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary.

In other implementations, the components of the ARFN 102 may be distributed in one or more locations within the environment 100. As mentioned above, microphones 218 and speakers 220 may be distributed throughout the scene. The projector 206 and the camera 210 may also be located in separate chassis 204.

Figure 3:
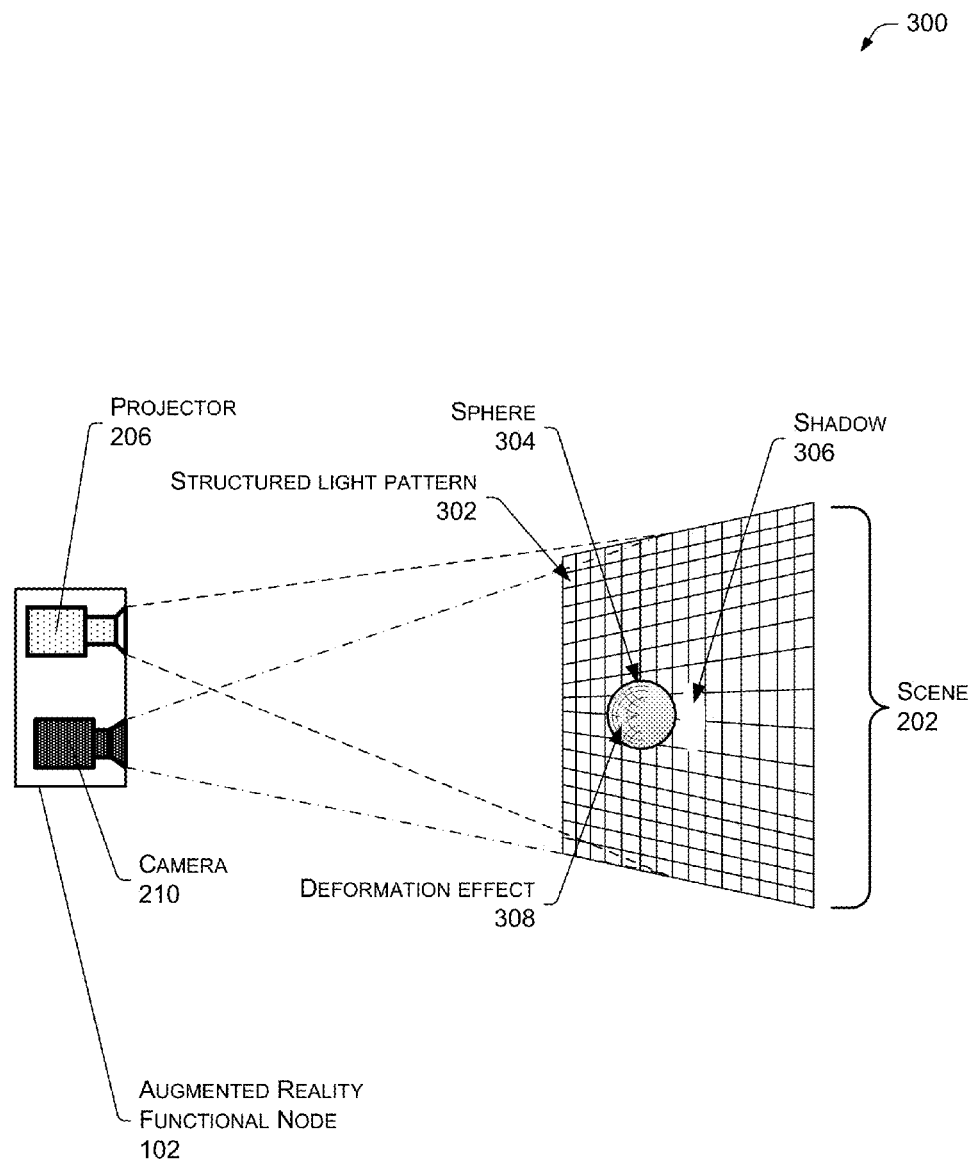
FIG. 3 illustrates the augmented reality functional node projecting a structured light pattern on a scene and receiving a corresponding image of the scene.

FIG. 3 illustrates a structured light pattern 300 impinging on the scene. In this illustration, the projector 206 within the ARFN 102 projects a structured light pattern 302 onto the scene 202. In some implementations a sequence of different structure light patterns 302 may be used. This structured light pattern 302 may be in wavelengths which are visible to the user, non-visible to the user, or a combination thereof. The structured light pattern 304 is shown in this example, but not by way of limitation, as a grid. In other implementations other patterns, such as bars, dots, pseudorandom noise, and so forth may be used. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

A sphere 304 is shown positioned between the projector 206 and a wall in the scene 202. A shadow 306 from the sphere 304 appears on the wall. Inspection of the sphere 304 shows a deformation effect 308 of the structured light pattern 302 as it interacts with the curved surface of the sphere 304.

This deformation effect 308 is detected by the camera 210. The camera 210 is configured to sense or detect the structured light. In some implementations, the camera 210 may also sense or detect wavelengths other than those used for structured light pattern 302. The image captured by the camera 210 is processed by the spatial analysis module 114 to characterize the scene 202. In some implementations, multiple cameras may be used to acquire the image.

The actual size of the sphere 304 in this example may not be readily determined based upon the geometry of the ARFN 102, diameter of the sphere 304, distance between the ARFN 102 and the sphere 304, and so forth. As a result, the spatial analysis module 114 may be configured to make one or more assumptions about the scene, and test those assumptions to constrain the dimensions of the scene 202 and maintain the model of the scene.

Figure 4:
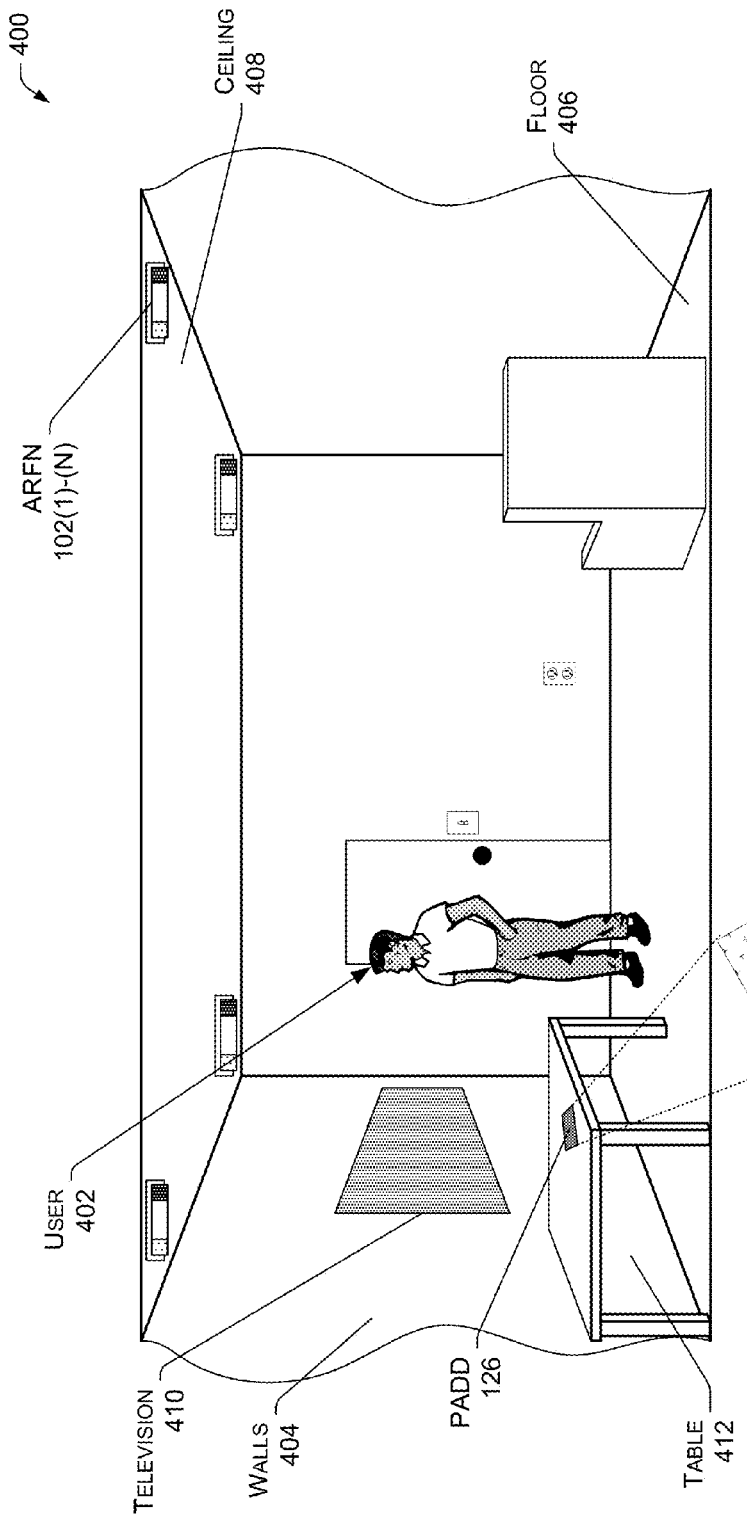
FIG. 4 is a detailed perspective view of an illustrative scene and augmented reality environment indicating the relative placement of physical objects including the PADD.

FIG. 4 is a detailed perspective view 400 of a scene and augmented reality environment. In this illustration, the scene comprises a room with a user 402 and is part of an augmented reality environment. While a single user 402 is shown, it is understood that the augmented reality environment may support multiple users. Walls 404, a floor 406, and a ceiling 408 bound the room. The augmented reality environment is maintained by multiple ARFNs 102 positioned in the corners of the ceiling 408 of the room. In other implementations one or more ARFNs 102 may be positioned at other locations within the scene. The ARFN 102 may access additional resources, such as those on the local area network, or cloud resources accessible via a wide area network.

Disposed on one of the walls 404 is a television 410 or computer display. Sitting in another corner of the room is a table 412. Resting upon the table is the PADD 126. An enlargement of this particular implementation shows the PADD 126 with watermarks disposed across the projection surface. As described below with regards to FIG. 7, watermarks may be used for tracking, identification, input recognition, and so forth.

The ARFN 102 may be configured to provide an augmented reality experience to users within the room. For example, the user 402 may wish to have notes from a recent meeting projected upon the PADD 126 for reference while viewing a high resolution photograph on the television 410. As the user 402 moves around the room with the PADD 126, the augmented reality module 122 utilizes the tracking and control module 124 to maintain the image of the notes on the PADD 126. In some implementations, the table 412 or other objects within the room such as countertops, placemats, and so forth may be equipped to act as PADDs 126.

The ARFN 102 may be configured such that sounds, motions of the user 402, motions of objects, signals from the PADD 126, or a combination thereof are recognized by the tracking and control module 124 as input. This input allows for interaction between the user and virtual or computer generated items.

Figure 5:
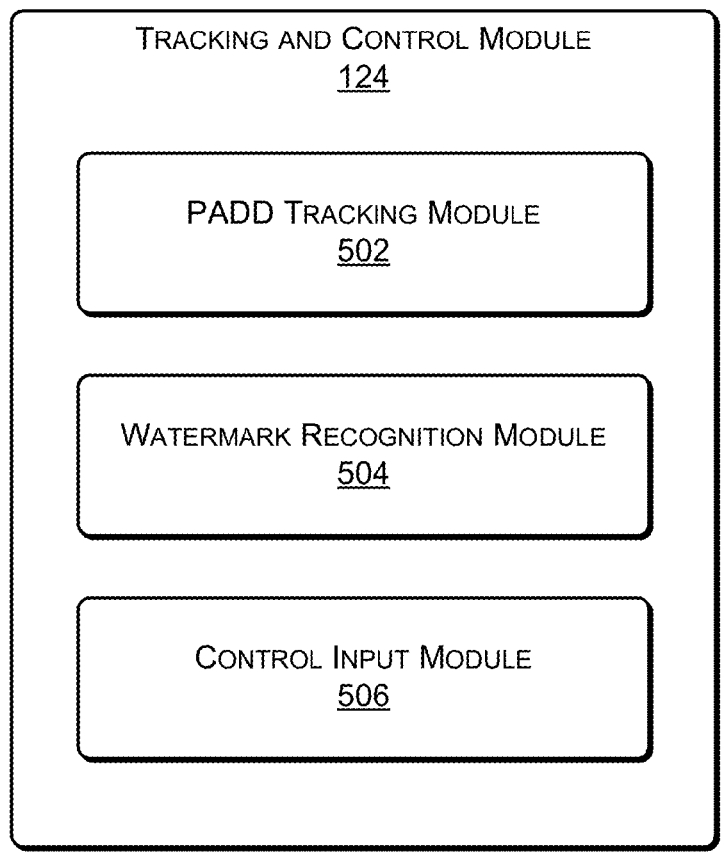
FIG. 5 is an illustrative diagram of a tracking and control module configured to track and accept control inputs from the PADD within the augmented reality environment.

FIG. 5 illustrates the tracking and control module 124 which, as described above, may be within the computing device 104 coupled to or incorporated within the ARFN 102. The tracking and control module 124 is configured to track PADDs 126 in the environment and to accept control inputs associated with the PADDs 126.

A PADD tracking module 502 accepts data from the spatial analysis module 114 as well as the other sensors within the environment. The PADD tracking module 502 leverages this data to identify, track, locate and orient one or more PADDs 126 within the scene.

The PADD tracking module 502 may identify the PADD 126 by shape, markings such as the watermarks, optical tags, signals emitted by the PADD 126, and so forth. For example, the ARFN 102 may image an optical tag such as a barcode on the PADD 126 which is then used by the PADD tracking module 502 to identify the particular PADD 126.

Tracking of the PADD's movement within the environment may include use of data from the spatial analysis module 114. For example, spatial analysis module 114 may be configured to track all objects in their motion, and provide information about the objects identified as PADDs 126 to the PADD tracking module 502 to allow for presentation of data on the PADD 126, monitoring for user input, and so forth. Similarly, orientation of the PADD 126 may also be maintained using data from the spatial analysis module 114 or other sensors in the environment.

As shown above with regards to FIG. 4, the PADD 126 may incorporate one or more watermarks across at least a portion of its surface. A watermark recognition module 504 is configured to detect and interpret watermarks on the PADD 126. The module 504 may utilize the watermarks to identify objects, track targets, detect orientation, interpret a known reference for use in gesture recognition, and so forth. Watermarks are discussed below in more detail with regards to FIGS. 7 and 14.

A control input module 506 leverages data pertaining to the PADD's 126 location, orientation, motion, and so forth to generate input for the augmented reality environment. For example, a user may rotate the PADD 126 with the rotation processed by the control input module 506 to be interpreted as an input to change the presentation on the PADD 126 from a view of notes to a view of a calendar.

The control input module 506 may also use data about interaction between the PADD 126 and other objects to generate input. For example, the user swiping a hand across the PADD 126 surface may change the presented page of notes to a next page.

In some implementations, the control input module 506 may accept input from passive or active signaling components within or associated with the PADD 126. For example, a user may activate a button on the PADD 126 which initiates a signal. Sensors in the environment receive the signal which is in turn processed by the control input module 506 and interpreted as a command to open a new set of notes.

Illustrative Components

Figure 6:
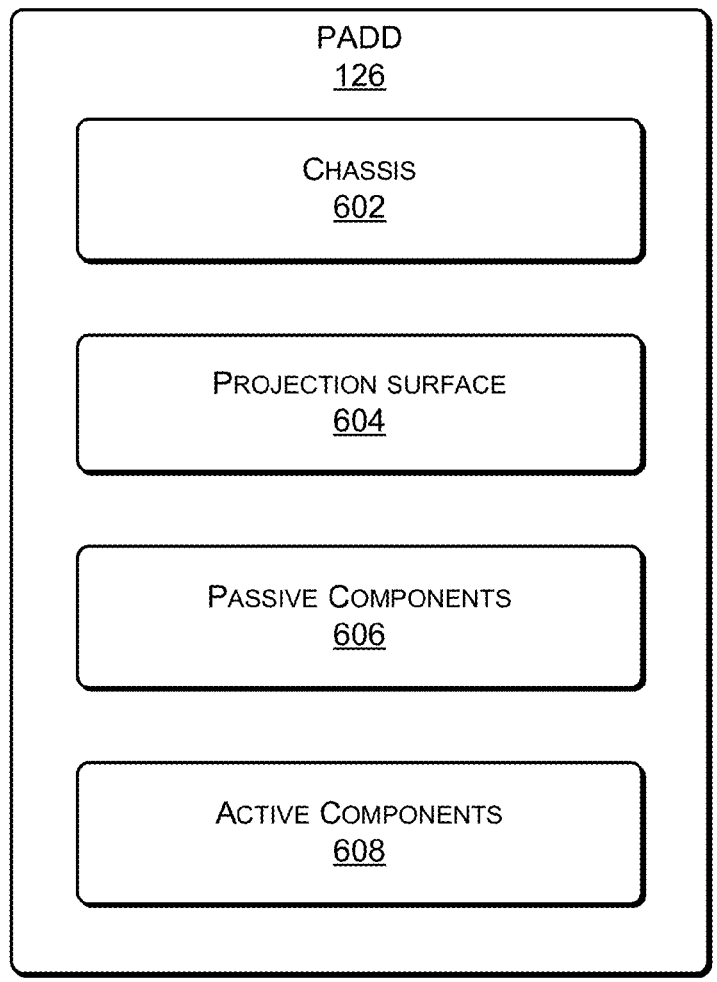
FIG. 6 is an illustrative diagram of certain components within the PADD. The PADD may be configured with one or both passive components and active components.

FIG. 6 illustrates components within the PADD 126. The PADDs 126 may be passive, include active components which utilize electrical power, or have a combination of active and passive components. The PADD 126 includes a chassis 602 or other structure configured to provide pre-determined physical characteristics and may act as an attachment point for other components. The chassis may comprise metal, plastic, ceramic, composite, or other materials.

A projection surface 604 is disposed along at least a portion of the surface of the PADD 126, and may be supported or maintained by the chassis 602. In some implementations, the projection surface 604 may be integral with the chassis 602. The projection surface 604 may have particular optical qualities, such as described below with regards to FIG. 7. The projection surface 604 may be configured such that it provides a surface suitable for presenting a projected image at visible light wavelengths. In some implementations, the projection surface 604 may be configured to be transparent at other wavelengths, such as infrared. The projection surface 604 may comprise plastic, ceramic, metal, composite, or other materials.

Passive components 606 may be incorporated into the PADD 126. As used in this disclosure, passive components do not require electrical power, and may simply be printed indicia or arrangements of elements. Passive components 606 may further be mechanical in nature, such as a mechanical button that creates a "clicking" sound or displaces a tuning fork to generate ultrasonic sound. Various illustrative passive components which may be incorporated into the PADD 126 are discussed below with regards to FIG. 8.

Active components 608 may also, or alternatively, be incorporated into the PADD 126. As used herein, active components require electrical power to operate. The active components may include power handling components, input components, output components, communication components, processing units, and so forth. The power may be provided locally by a source on the PADD or from a remote location in the environment. Illustrative active components 608 which may be incorporated into the PADD 126 are discussed below with regards to FIGS. 9-13.

Figure 7:
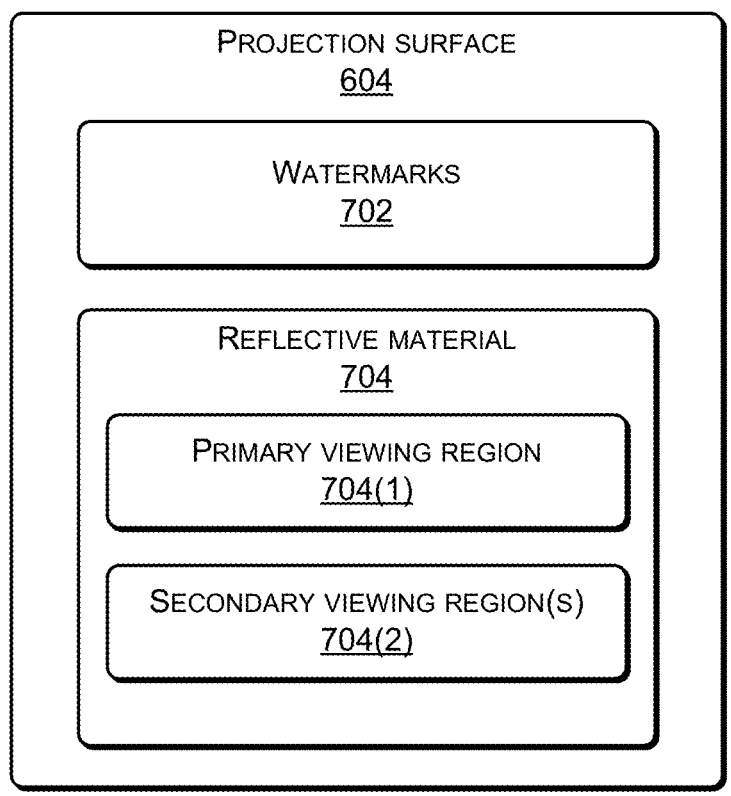
FIG. 7 is an illustrative diagram of a projection surface which may be incorporated into the PADD of FIG. 6.

FIG. 7 illustrates components of the projection surface 604. The projection surface 604 is disposed along at least a portion of the surface of the PADD 126, and may be supported or maintained by the chassis 602. In other implementations, the chassis 602 may comprise the projection surface 604.

In some implementations, the projection surface 604 may incorporate a watermark 702. Watermarks are features or markings with optical characteristics configured to be scanned by the augmented reality system, such as by the camera 210 of the ARFN 102. The watermarks may be disposed upon, within, or under the projection surface 604 and may be visible or non-visible to the user. The watermarks 702 may be disposed across a portion of the projection surface 604, or across the entire projection surface 604.

Watermarks may also be used to aid in focusing the projector 206, camera 210, or both. Given the known reference pattern of a watermark or other feature on the PADD 126, the focus of the projector 206, camera 210, or both may then be adjusted to bring the reference pattern into a pre-determined configuration associated with an optically focused condition.

In some implementations, the watermark may comprise a pseudorandom noise (PN) pattern. As described above, the PN pattern allows a particular point within the pattern to be determined. This allows for interpretation of gestures or movements of other objects relative to the PADD 126. For example, a finger of the user holding the PADD 126 occludes a portion of a watermark pattern disposed on the surface thereof. By scanning the watermark 702 with the ARFN 104, the tracking and control module 124 determines what points of the PN pattern are not visible and calculates the relative placement of the user's fingers on the PADD 126.

The watermark 702 may also contain information about the particular PADD 126. As described above, the watermark recognition module 504 may be configured to read this information and provide it to other modules within the system, such as the tracking and control module 124. This information may include details such as a product number, version number, surface characteristics, presentation capabilities, device inventory, dimensions, shape, and so forth. Where dimensional information is included, the watermark 702 may be utilized to determine dimensions of other objects within the scene.

The projection surface 604 comprises a reflective material 704, configured to present an image, such as projected by the projector 206. This reflective material 704 is configured to diffusely reflect incident light. The reflective material 704 may comprise ceramics, plastics, metals, or a combination thereof.

The reflective material 704 on the PADD 126 may have one or more viewing regions. Each viewing region may be configured to have pre-determined optical qualities. Regions with the same or different optical qualities may be placed at different locations on the PADD 126.

The optical qualities may be configured to vary an amount of incident light which is reflected as a function of a relative angle between the source of the incident light and a plane of the projection surface 604. For example, reflectance may be less for incident light impinging at an oblique angle to the projection surface compared to incident light impinging perpendicular or orthogonal to the projection surface.

In this illustration, two types of regions for the reflective material are depicted: a primary viewing region 704(1) and a secondary viewing region 704(2). The regions and optical qualities therein may be configured to provide the visual feedback to the user as to the relative angle between the projection surface 604 and the projector 206. The visual feedback aids in the maintenance of an orientation between the PADD 126 and the projector 206 which is within the preferential angular range. This visual feedback may be bands, arrows, images, and so forth which manifest as a result of a variation in reflectance with angle. The placement of these regions and the visual feedback are described below with regards to FIGS. 15-18.

Figure 8:
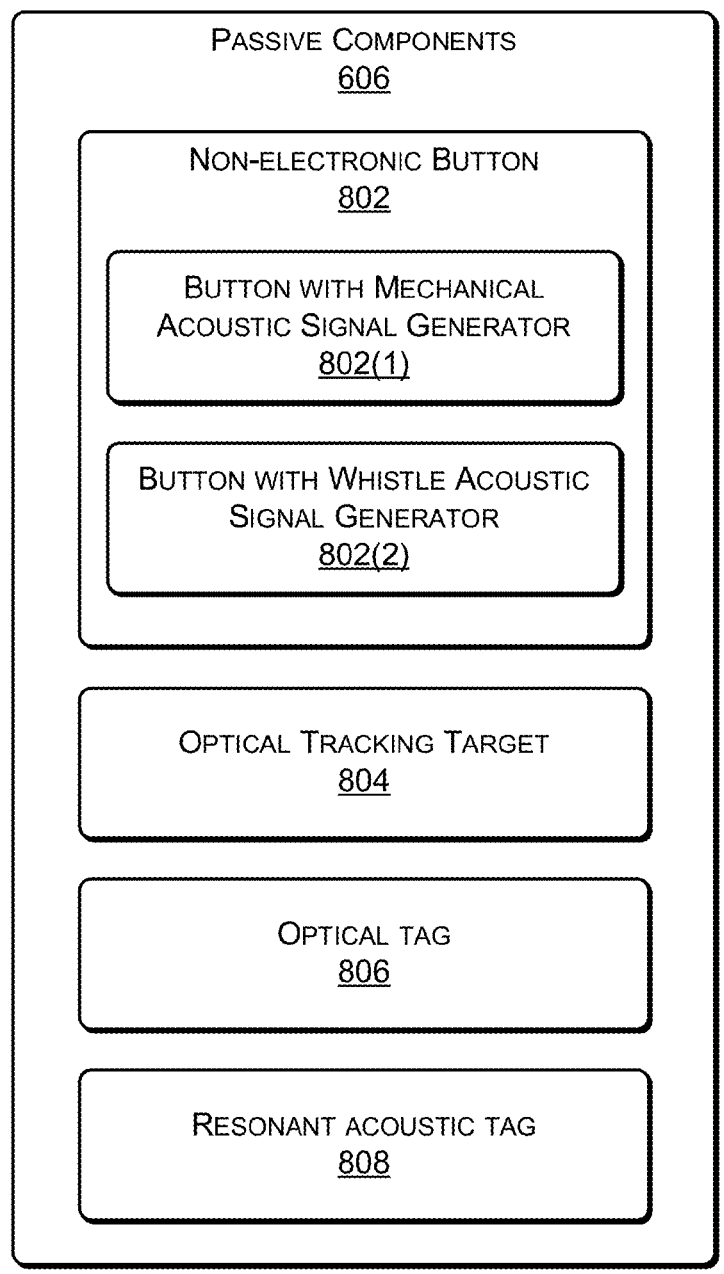
FIG. 8 is an illustrative diagram of passive components which may be incorporated into the PADD of FIG. 6.

FIG. 8 illustrates an example set of passive components 606 which may be incorporated into the PADD. The following components are described for illustration and not by way of limitation. In various implementations, different combinations of these or other passive components may be used.

A non-electronic button 802 generates a signal which the ARFN 102 is configured to receive. Once received, the tracking and control module 124 may interpret the signal as an input and initiate a pre-determined function. For example, the signal may be associated with a command to change the display to the next page of notes.

The signal generated by the non-electronic button 802 may be acoustic. The acoustic signal may be perceptible to users or imperceptible to users (e.g., ultrasonic). A button with a mechanical acoustic signal generator 802(1) may be configured to, upon activation, manipulate a physical mechanism to generate an acoustic signal. For example, a lever may displace a tuning fork or rod to generate a particular acoustic signal. Likewise, a button with a whistle acoustic signal generator 802(2) may use the physical displacement of a button to force air through a channel configured to generate an acoustic signal.

Different non-electronic buttons 802 may be configured to have different signal characteristics. For example, frequency, overtones, phase, decay, and so forth may vary between buttons. These variations may allow activation of a particular button to be distinguished from activation of another button. When distinguishable, the different non-electronic buttons 802 may be associated with different commands or functions.

The passive components 606 may also include optical components. One or more optical tracking targets 804 may be configured to provide known points upon the PADD 126 for the tracking and control module 124 to follow. The optical tracking targets 804 may be configured to be visible or non-visible to the user. For example, optical tracking targets comprising an asymmetrical arrangement of marks visible under infrared light may be disposed at one or more locations on the PADD 126. By imaging the marks of the tracking target with the ARFN 102, the tracking and control module 124 is able to reconstruct the orientation.

An optical tag 806 may also be disposed on the device. The optical tag 806 encodes information, such as an identification number of the particular PADD 126. The optical tag 806 may be configured to be read from multiple orientations. When the optical tag 806 is orientation-specific, it may also be used as an optical tracking target.

The optical tag 806, or other scannable features such as watermarks 702, optical tracking targets 804, and so forth may also be used to receive input from the user. By occluding the optical tag 806 or other scannable feature, the ARFN 102 may detect the occlusion and the tracking and control module 124 may interpret the occlusion as an input. For example, covering the optical tag 806 with a hand for a pre-determined length of time may trigger the ARFN 102 to project a control menu onto the associated PADD 126.

A resonant acoustic tag 808 may also be provided. The resonant acoustic tag 808 may be configured such that upon receipt of an impinging acoustic signal, an acoustic signal generated. The resonant acoustic tag 808 may comprise components such as a resonant chamber, tuning fork, and so forth. For example, the resonant acoustic tag 808 may be configured to resonate with an ultrasonic signal at 30 kHz and generate an acoustic signal at 35 kHz. By varying either intentionally or through allowance of production variances the characteristics of the resonant acoustic tag 808, different signals may result. These different signals may be used to identify the different resonant acoustic tags 808.

The resonant acoustic tags 808 may also be used to provide orientation cues to the tracking and control module 124. The degree of acoustic coupling and resulting resonant signal may be used to determine a relative orientation of the resonant acoustic tag 808 relative to the sound source, distance, and so forth. For example, maximum coupling may occur when the resonant acoustic tag 808 is perpendicular to the acoustic wavefront, compared to minimal coupling when parallel. Additionally, multiple resonant acoustic tags 808 may be emplaced in the PADD 126 and their relative positions used to determine orientation and location.

Figure 9:
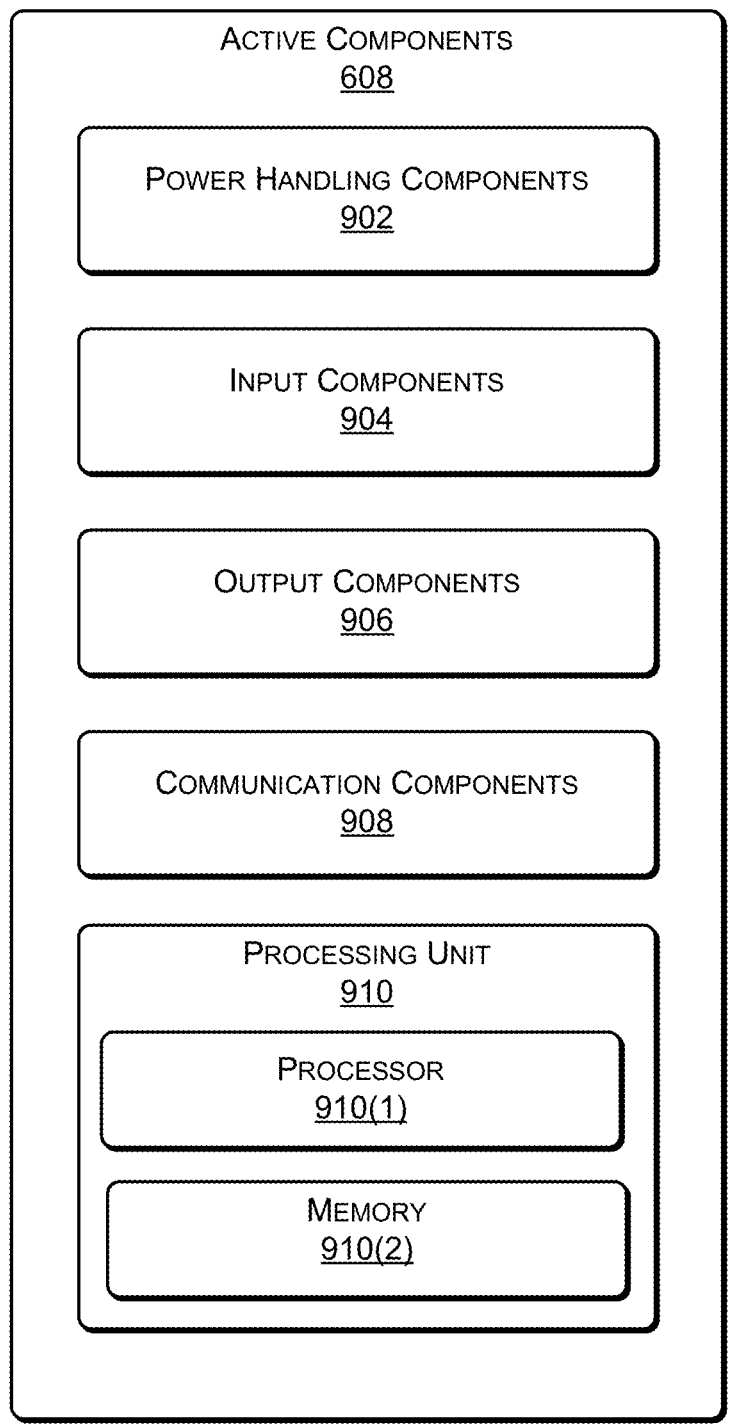
FIG. 9 is an illustrative diagram of active components which may be incorporated into the PADD of FIG. 6.

FIG. 9 illustrates active components 608 which may be incorporated into the PADD 126. The active components 608 require electricity to operate. The following active components 608 are described for illustration and not by way of limitation. In various implementations various combinations of these or other active components 608 may be used.

Power handling components 902 provide electrical power to other active components within the PADD 126. Power handling components may acquire, store, condition, or otherwise manipulate electrical power for the use of the other active components. The power handling components 902 are discussed in more detail below with regards to FIG. 10.

Input components 904 accept input from the user, the environment, or other devices. The user inputs may include touches, button activations, biomedical data, biometric information, and so forth. This input may then be used by the tracking and control module 124 to modify the augmented reality environment. The input components 904 are discussed in more detail below with regards to FIG. 11.

Output components 906 are configured to generate output such as sound, vibrotactile sensations, visible indicators, and so forth. The output components 906 may be used to enhance the interaction of the user with the PADD 126 in the augmented reality environment. The output components 906 are discussed in more detail below with regards to FIG. 12.

Communication components 908 enable the active components within the PADD 126 to communicate with other devices, such as the ARFN 102. The communication may be bidirectional or unidirectional. The communication components 908 are discussed in more detail below with regards to FIG. 13.

The PADD 126 may also include one or more processing units 910. The processing unit 910 may be an analog, digital, or combination device configured to accept an input signal and generate a pre-determined output signal. In some implementations the processing unit 910 may include a processor 910(1) and associated memory 910(2).

Figure 10:
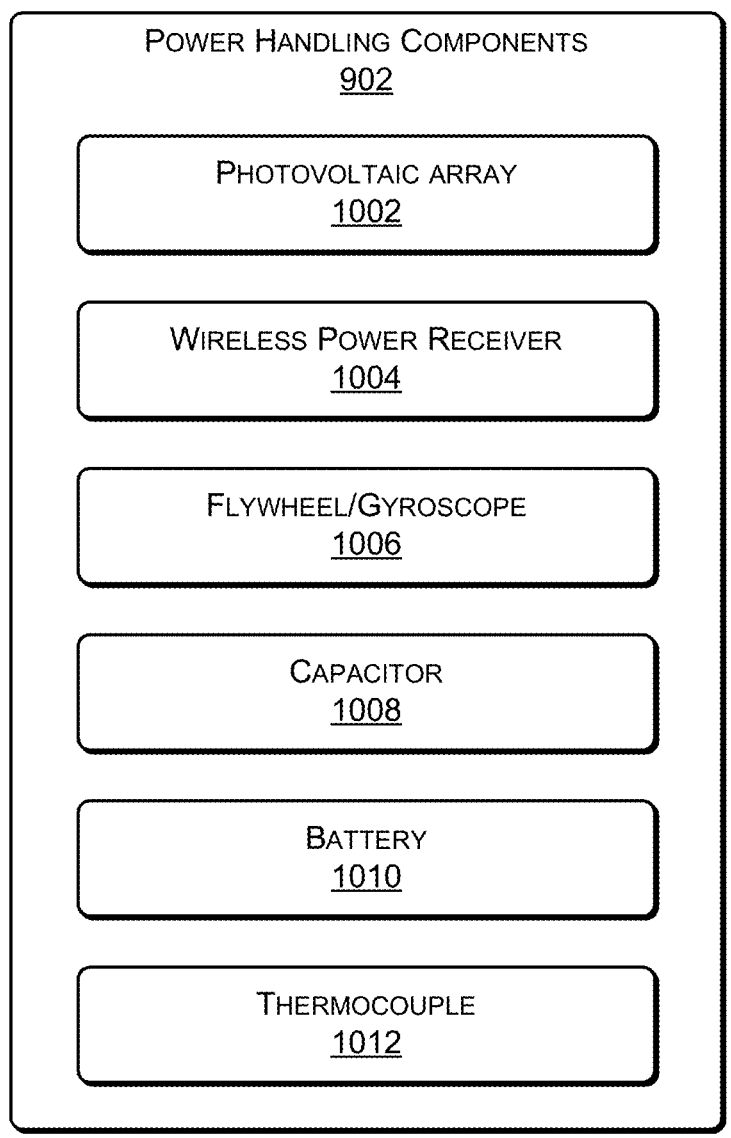
FIG. 10 is an illustrative diagram of power handling components which may be part of the active components of FIG. 9 and incorporated into the PADD of FIG. 6.

FIG. 10 illustrates the power handling components 902 which may be incorporated into the PADD 126. The power handling components acquire, store, condition, or otherwise manipulate electrical power for the use of the other active components. The following components are described for illustration and not by way of limitation. In various implementations various combinations of these or other components may be used.

A photovoltaic array 1002 converts incident light into electrical power. The photovoltaic array 1002 may be configured to operate in conjunction with light emitted by the projector 206 of the ARFN 102. Other devices such as the projector 206 may also be adjusted to optimize power transfer. For example, projector 206 may be configured to provide areas of greater illumination upon pre-determined areas of the photovoltaic array 1002 to provide power. The photovoltaic array 1002 may disposed along at least a portion of one or more surfaces of the PADD 126. For example, in one implementation the photovoltaic array 1002 may be disposed in a band around a perimeter of the projection surface 604.

A wireless power receiver 1004 is configured to receive broadcast power, such as from the wireless power transmitter 226. Power may be transmitted wirelessly via inductive coupling, resonant coupling, capacitive coupling, and so forth. The wireless power receiver 1004 provides the received electrical power to other active devices within the PADD 126.

In some implementations the wireless power receiver 1004 may be configured to receive parasitic power. Parasitic power involves the capture and conversion of ambient electromagnetic energy for conversion into electrical power. For example, the wireless power receiver 1004 may be configured with a broadband radio receiver which converts electromagnetic energy from cellular telephone radio signals into electricity.

The PADD 126 may incorporate one or more flywheels or gyroscopes 1006. The rotational kinetic energy of the rotating flywheel/gyroscope 1006 may be used to stabilize the PADD 126 in the user's hand. Such stabilization may minimize small movements due to hand tremors, and improve presentation of the projected image. A pair of flywheel/gyroscopes 1006 may be operated with opposing rotations to cancel out torque effects.

The flywheel/gyroscope 1006 may also be used as an energy storage device. Electrical power received by the PADD 126, such as by the photovoltaic array 1002 or the wireless power receiver 1004, may be stored as rotational kinetic energy in the flywheel/gyroscope 1006. When the active components within the PADD 126 call for energy, the rotational energy may be converted back into electrical energy to satisfy the demand. Energy storage is worthwhile to provide operation of active components during periods when external power is unavailable, or to provide energy during peak loads. For example, when the photovoltaic array 1002 is blocked from the projected light or when the PADD 126 is beyond the range of the wireless power receiver 1004.

A capacitor 1008 may also be used to store energy, as well as a chemical battery 1010. The chemical battery may comprise a lithium-ion battery, a nickel-cadmium battery, a nickel metal hydride battery, alkaline battery, zinc air battery, and so forth. This battery may be a single use or rechargeable configuration.

Figure 11:
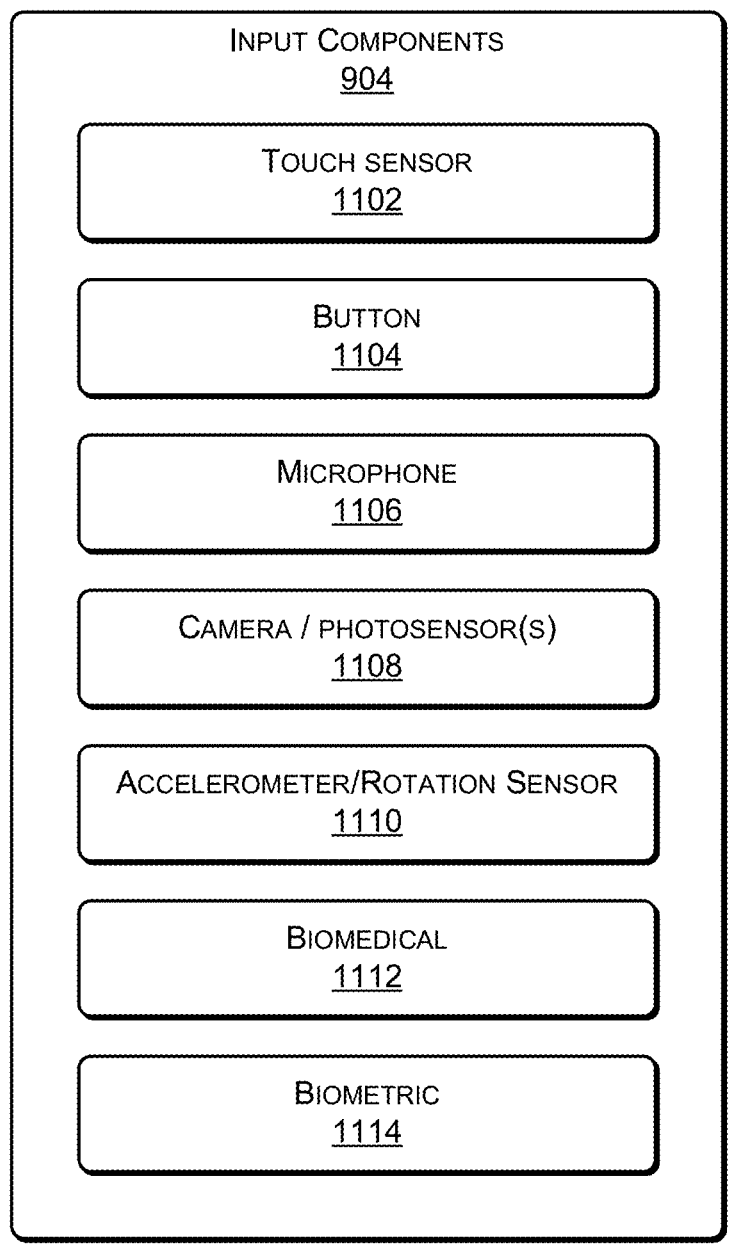
FIG. 11 is an illustrative diagram of input components which may be part of the active components of FIG. 9 and incorporated into the PADD of FIG. 6.

FIG. 11 illustrates the input components 904 which may be incorporated into the PADD. As described above, the input components 904 accept input from the user, the environment, or other devices. The following components are described for illustration and not by way of limitation. In various implementations various combinations of these or other components may be used.

A touch sensor 1102 may accept touch input. In some implementations the touch sensor 1102 may be coincident with the projection surface 604. The touch sensor 1102 may comprise a capacitive touch sensor, projected capacitance touch sensor, interpolating force sensitive resistor (IFSR) touch sensor, and so forth. For example, the IFSR touch sensor may be used to obtain touch information including applied pressure.

A button 1104 accepts a user motion and converts it into a signal. The button may be coupled to other components such as a processing unit 910, communication components 908, and so forth.

A microphone 1106 allows the PADD 126 to accept sound input. Likewise, a camera or photosensor 1108 may be configured to allow the PADD 126 to accept light input. An accelerometer/rotation sensor 1110 is configured to provide input about the movement of the PADD 126 in space.

Biomedical input 1112 may be received as well by the PADD 126. Sensors may be incorporated to allow capture of data about galvanic skin resistance, temperature, heart rate and rhythm, blood pressure, respiration, chemical composition, and so forth. These sensors may also include non-contact sensors such as an infrared pulse-oximeter. This biomedical input 1112 may be provided to the ARFN 102 which may modify the augmented reality environment based upon these inputs. For example, a user with an elevated heart rate and galvanic skin response may be determined to be under stress and may be presented with a simpler user interface.

Biometric input 1114 of the user may also be acquired. The biometric input 1114 may include iris or facial data acquired via the camera 1108, fingerprints, and so forth. This biometric input 1114 may be used for identification, authentication, authorization, and so forth.

Figure 12:
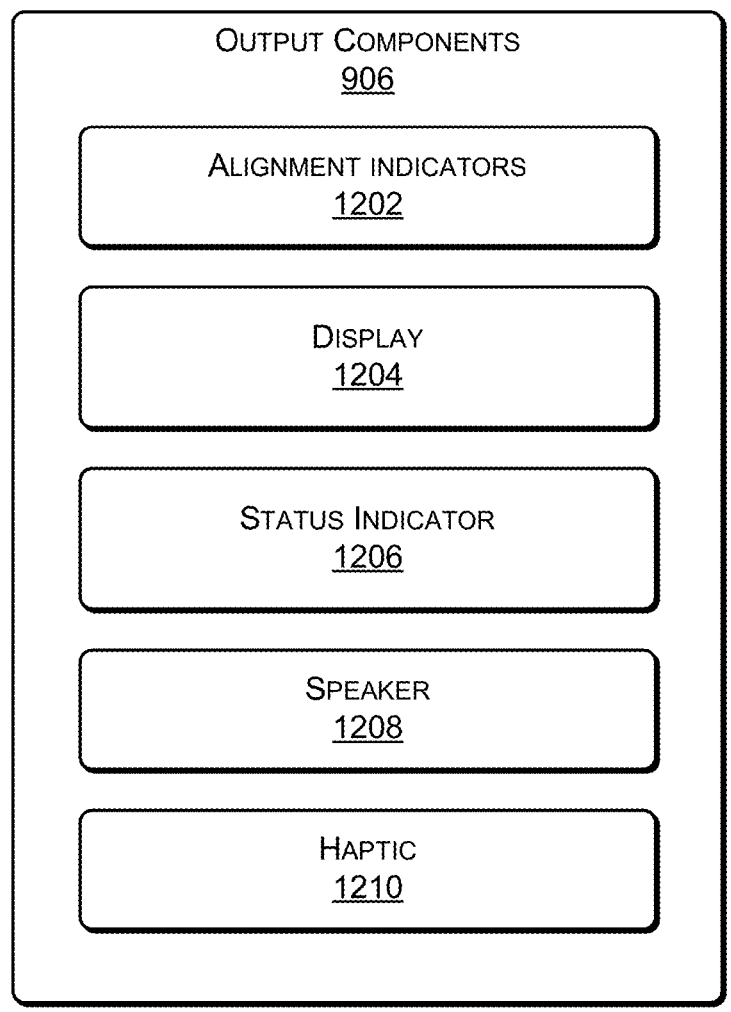
FIG. 12 is an illustrative diagram of output components which may be part of the active components of FIG. 9 and incorporated into the PADD of FIG. 6.

FIG. 12 illustrates the output components 906 which may be incorporated into the PADD 126. As described above, the output components 906 are configured to generate outputs such as sound, vibrotactile sensations, visible indicators, and so forth. These outputs may be used to enhance the interaction of the user with the PADD 126 in the augmented reality environment. The following components are described for illustration and not by way of limitation. In various implementations various combinations of these or other components may be used.

Alignment indicators 1202 may be provided which present visible feedback to the user to maintain the relative angle between the projection surface 604 of the PADD 126 and the projector 206 within the preferential angular range. For example, a compass rose of light emitting diode (LED) indicators may be presented which, when particular indicators are illuminated, direct a user to reorient the PADD 126 so that the desired orientation is achieved. The alignment indicators 1202 may use visible output, audible output, haptic output, or a combination thereof.

A display 1204 may also be provided on the PADD 126. The display 1204 may comprise a liquid crystal display, interferometric display, light emitting diode display, cholesteric display, electrophoretic display, and so forth. The display 1204 may be configured to provide data to the user in addition to the image projected onto the projection surface 604 by the projector 206.

A status indicator 1206 may comprise one or more light emitting diodes, electrophoretic elements, and so forth to indicate status of the device. For example, the status indicator 1206 may change to indicate the PADD 126 has insufficient power to operate the active components therein.

A speaker 1208 may be configured to generate audible output. This audible output may be coordinated with audio from the speakers 220 on the ARFN 102 to provide various audio effects, such as apparent motion of a sound source.

The output components 906 may also include a haptic component 1210. This haptic component may include the one or more haptic actuators configured to provide vibrotactile output. The haptic actuators may comprise piezoelectric actuators coupled to the chassis 602. The haptic output provides a physical sensation to the user. This provides a more immersive augmented reality environment. In some implementations, the haptic component 1210 may be configured to also generate audible sounds, and thus perform the function of a speaker as well.

Figure 13:
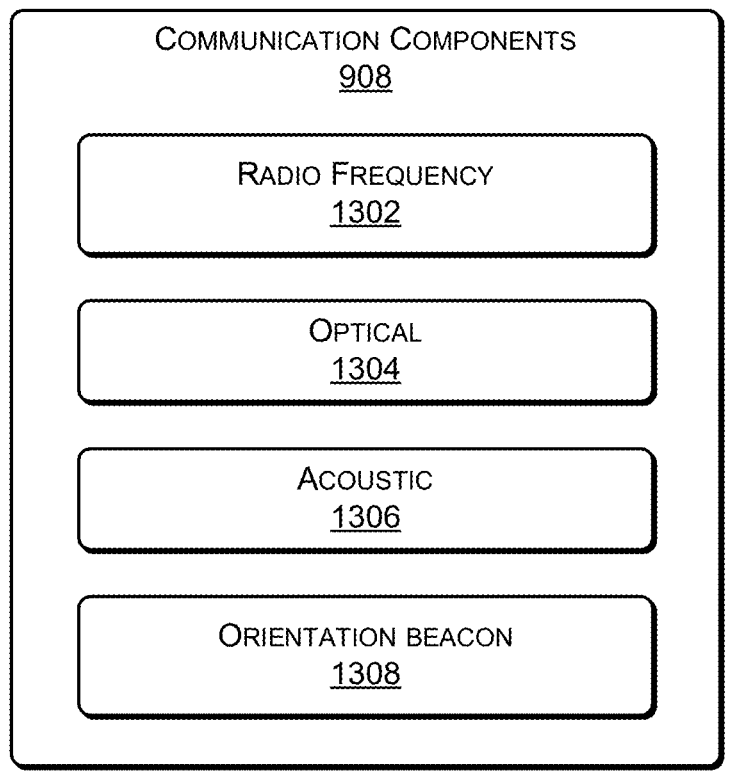
FIG. 13 is an illustrative diagram of communication components which may be part of the active components of FIG. 9 and incorporated into the PADD of FIG. 6.

FIG. 13 illustrates the communication components 908 which may be incorporated into the PADD 126. The communication components 908 enable the active components within the PADD 126 to communicate with other devices, such as the ARFN 102. The communication may be bidirectional or unidirectional. For example, the PADD 126 may receive audio for playback on the speaker 1208 or send user input from the touch sensor 1102. The following components are described for illustration and not by way of limitation. In various implementations various combinations of these or other components may be used.

A radio frequency 1302 component may provide communication using radio frequency electromagnetic energy. This component may use proprietary communications formats, open standards such as WiFi and Bluetooth, or a combination thereof. The radio frequency 1302 component may also include radio frequency identification tags, or other electrical radio communication devices.

An optical 1304 component provides communication using light in visible or non-visible wavelengths. Non-visible wavelengths include infrared and ultraviolet. The optical 1304 component may generate a modulated signal for transmission such as with a laser or LED, or may modulate an incoming carrier. For example, a digital micromirror device may be configured to modulate incident light from the projector 206 with data. The modulated incident light may then be recovered by the camera 210 and the data therein received by the computing device 104. The optical communication module 1304 may also be configured to receive signals from the ARFN 102 or other devices within the environment. These signals may include commands to the PADD 126 to change operating modes, generate haptic output, generate visual output, and so forth.

Communication using acoustic signals is provided by an acoustic 1306 component. These acoustic signals may be audible or inaudible. Inaudible sounds include ultrasonic sounds having frequencies above 20 kHz. This component 1306 may generate modulated acoustic signals for output via a speaker, piezoelectric transducer, and so forth.

One or more orientation beacons 1308 may be placed within the PADD 126. The orientation beacons 1308 generate signals which may be acquired by the ARFN 102 and used by the tracking and control module 126 to determine orientation, location, or both within the scene. The orientation beacons 1308 may comprise one or more infrared optical transmitters, ultrasonic transmitters, radio transmitters, and so forth. The orientation beacons 1308 may be emplaced within the PADD 126 beneath the projection surface 604. In this configuration, the projection surface 604 is configured to be transparent to the beacon signal. For example, where the orientation beacon 1308 comprises an infrared transmitter, the projection surface 604 may be configured to be transparent to the infrared wavelength used.

Illustrative Passive Configurations

As described above, in the augmented reality environment the PADD 126 presents images projected by the projector 206. The following figures depict various implementations of the PADD 126. Some implementations are passive (FIGS. 14, 15, 19, and 20), while others are active (FIGS. 21, 23, 26, 27).

Figure 14:
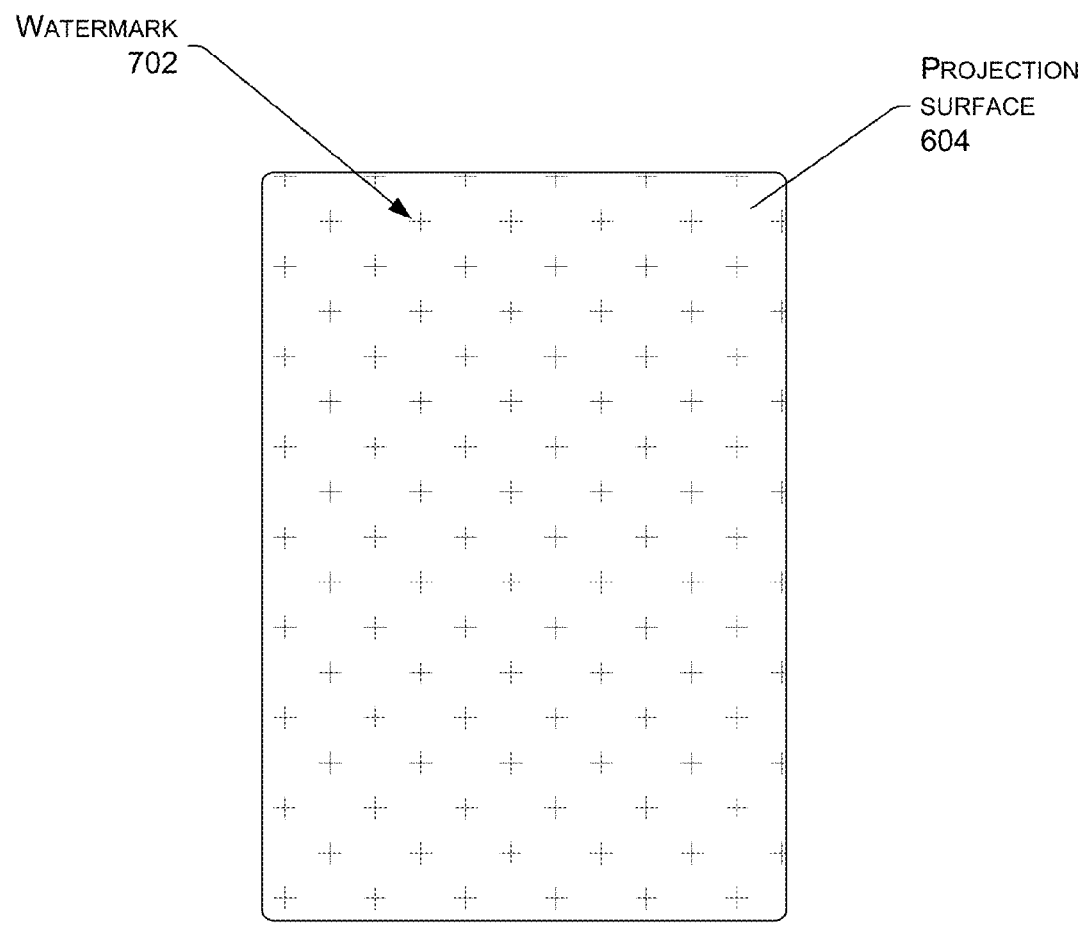
FIG. 14 is an illustrative configuration of a watermark on the projection surface of the PADD.

FIG. 14 shows one example of a passive configuration 1400 in which watermarks 702 are provided on the projection surface 604 of the PADD. In this illustration and not by way of limitation, the watermarks 702 are visible. As described above, the watermarks 702 may be configured to be scanned with non-visible light, such that it is not visible to the user.

When visible watermarks 702 are used, the projected image may be adjusted by the ARFN 102 to counter visible effects of the watermark 702. As a result, upon projection of the image on the projection surface 604, the visible watermark 702 is subsumed into the projected image. For example, the watermarks may be printed in light green ink on the projection surface 604. The projected image may be configured to have slightly less green at the positions of the watermarks, such that the green of the watermarks "fills in" the green which was omitted in the projected image.

Figure 15:
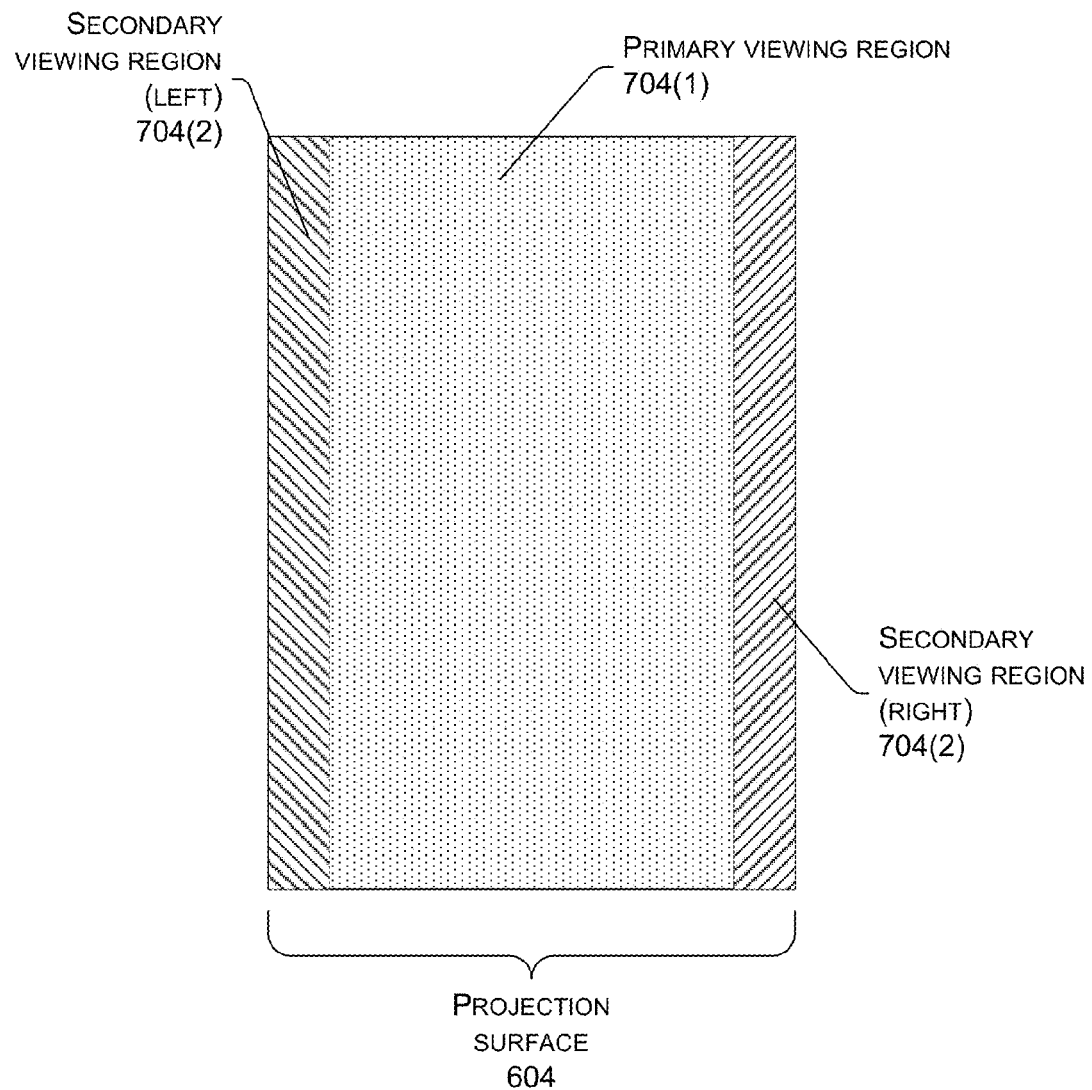
FIG. 15 is an illustrative configuration of multiple viewing regions on the projection surface of the PADD.

FIG. 15 is an illustrative configuration 1500 of one implementation of the projection surface 604 having multiple viewing regions 704. As described above, each region may be configured to have pre-determined optical qualities. In this illustration, the primary viewing region 704(1) is disposed in the center of the PADD 126, with two of the secondary viewing regions 704(2) being disposed along the edges to either side of the primary viewing region 704(1). Regions with the same optical qualities may be placed at different locations on the PADD 126. In this example, the optical qualities of these regions is configured so that reflectance varies with the incident angle, as described below with regards to FIG. 16.

Figure 16:
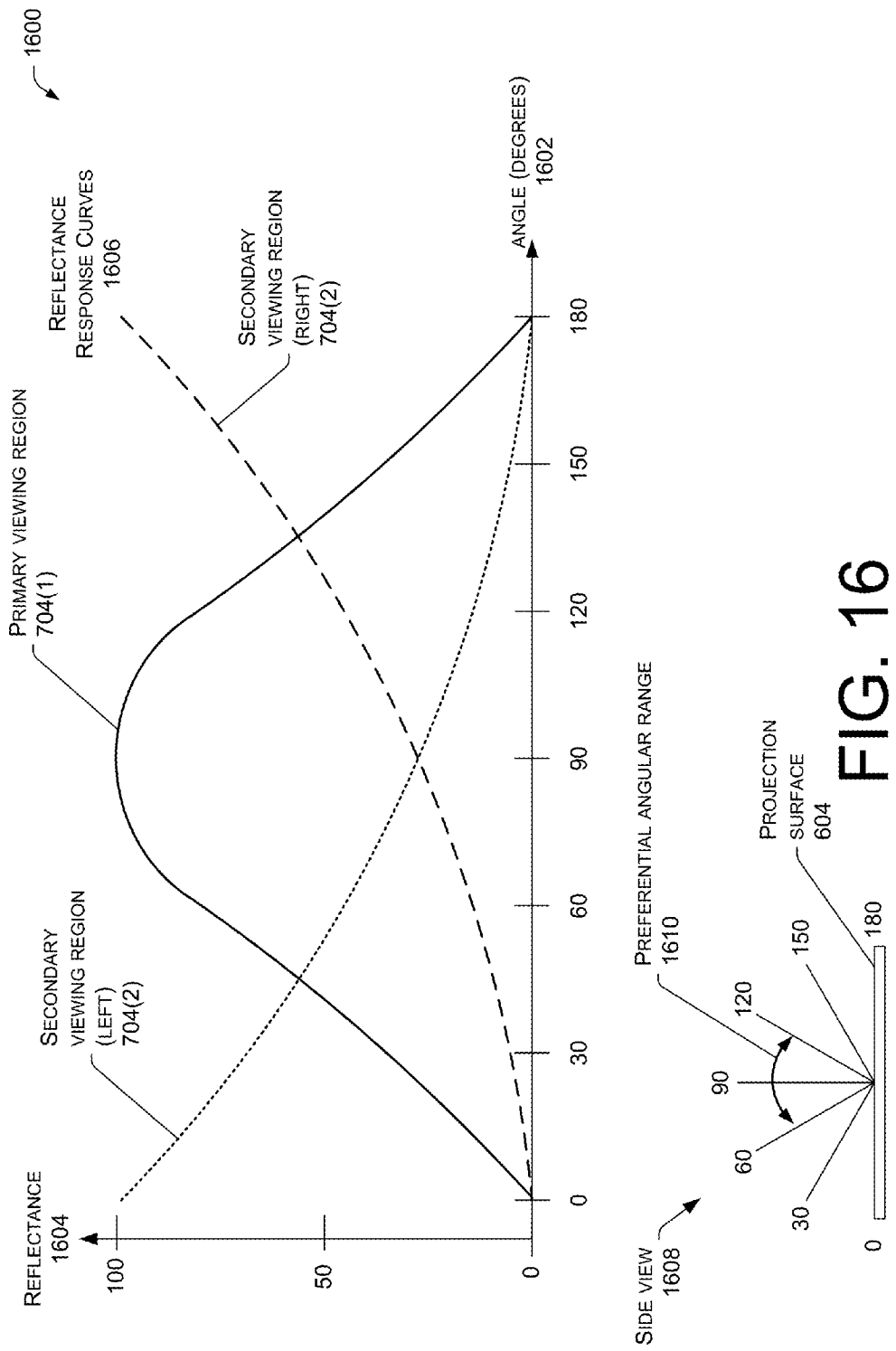
FIG. 16 is an illustrative graph showing reflectance response curves of the different viewing regions on the projection surface of the PADD.

FIG. 16 is an illustrative graph 1600 showing reflectance response curves of the different viewing regions 704 on the projection surface 604 of the PADD 126. Along a horizontal axis an angle in degrees of incident light 1602 is indicated, ranging from 0 to 180 degrees. Along a vertical axis expresses the degree of reflectance 1604 ranging from 0 to 100. Plotted on this graph are three reflectance response curves 1606.

A first reflectance response curve depicts the reflectance as a function of the angle of incident light for the left secondary viewing region 704(2) in the projection surface 604. With this curve, as the angle increases the reflectance decreases. A second reflectance response curve for the right secondary viewing region 704(2) is shown, in which the reflectance increases as the angle increases.

The reflectance response curve for the primary viewing region 704(1) indicates that the reflectance increases to a maximum at an incident angle of 90 degrees, then symmetrically decreases as the angle approaches 180 degrees. A side view 1608 depicts the various angles relative to the projection surface 604. A pre-determined preferential angular range 1610 is depicted extending from about 60 degrees to about 120 degrees.

As mentioned above, tracking and presentation of an image upon the PADD 126 may be facilitated when the relative angle between the projector 206 and the projection surface 604 on the PADD 126 is maintained within the pre-determined preferential range 1610. By maintaining the PADD 126 within the preferential angular range, computational and optical complexity to maintain an image on the PADD may be reduced while improving the quality of the presented image on the projection surface 604.

In this illustration, two types of region are depicted, the primary viewing region 704(1) and the secondary viewing region 704(2). The viewing regions and the optical qualities therein may be configured to provide visual feedback to a user as to a relative angle between the projection surface 604 and the projector 206. This visual feedback may be bands, arrows, images, and so forth which manifest as a result of a variation in reflectance with angle. The construction of the PADD 126 with these viewing regions is described below with regards to FIG. 17. The visual feedback aids in the maintenance of a preferential orientation between the PADD 126 and the projector 206. A depiction of the visual feedback is presented below with regards to FIG. 18.

Figure 17:
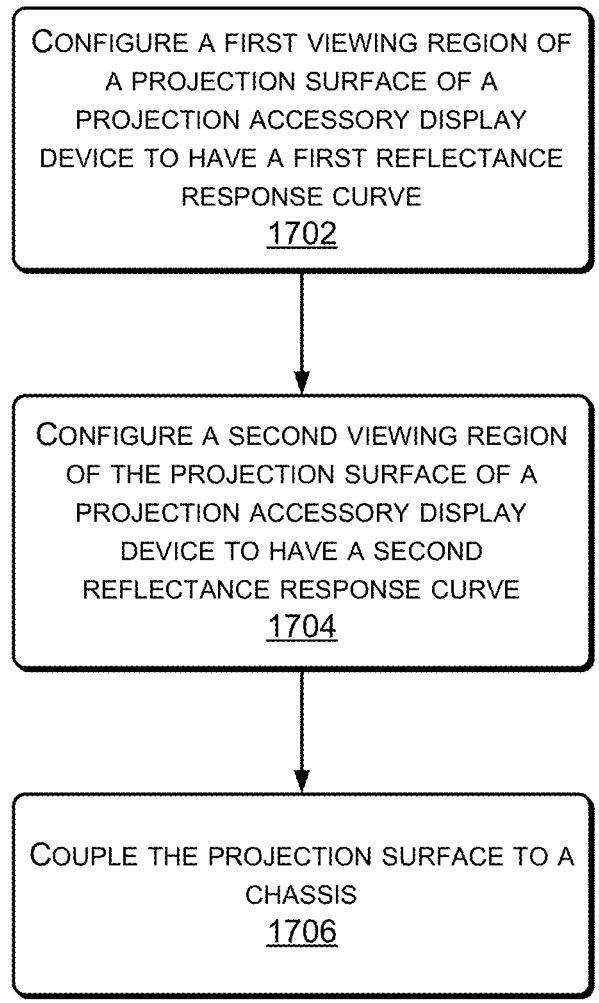
FIG. 17 is an illustrative process of configuring the projection surface with multiple viewing regions.

FIG. 17 is an illustrative process 1700 of configuring the projection surface 604 with multiple viewing regions 704. The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 1702, a first viewing region of the projection surface 604 of the PADD 126 is configured to have a first reflectance response curve. This configuration may comprise etching, imprint lithography, embossment, doping, and so forth.

At 1704, a second region of the projection surface 604 of the PADD 126 is configured to have a second reflectance response curve. As described above, the different reflectance response curves may be utilized to provide visual feedback to the user to maintain the orientation of the PADD 126 within the preferential angular range.

At 1706, the projection surface 604 is coupled to a chassis 602. This coupling may include lamination, adhesion, mechanical fastening, and so forth. In some implementations, the projection surface 604 may be integrated with the chassis 602. For example, a projection surface pattern may be imprinted into a surface of the chassis 602.

Figure 18:
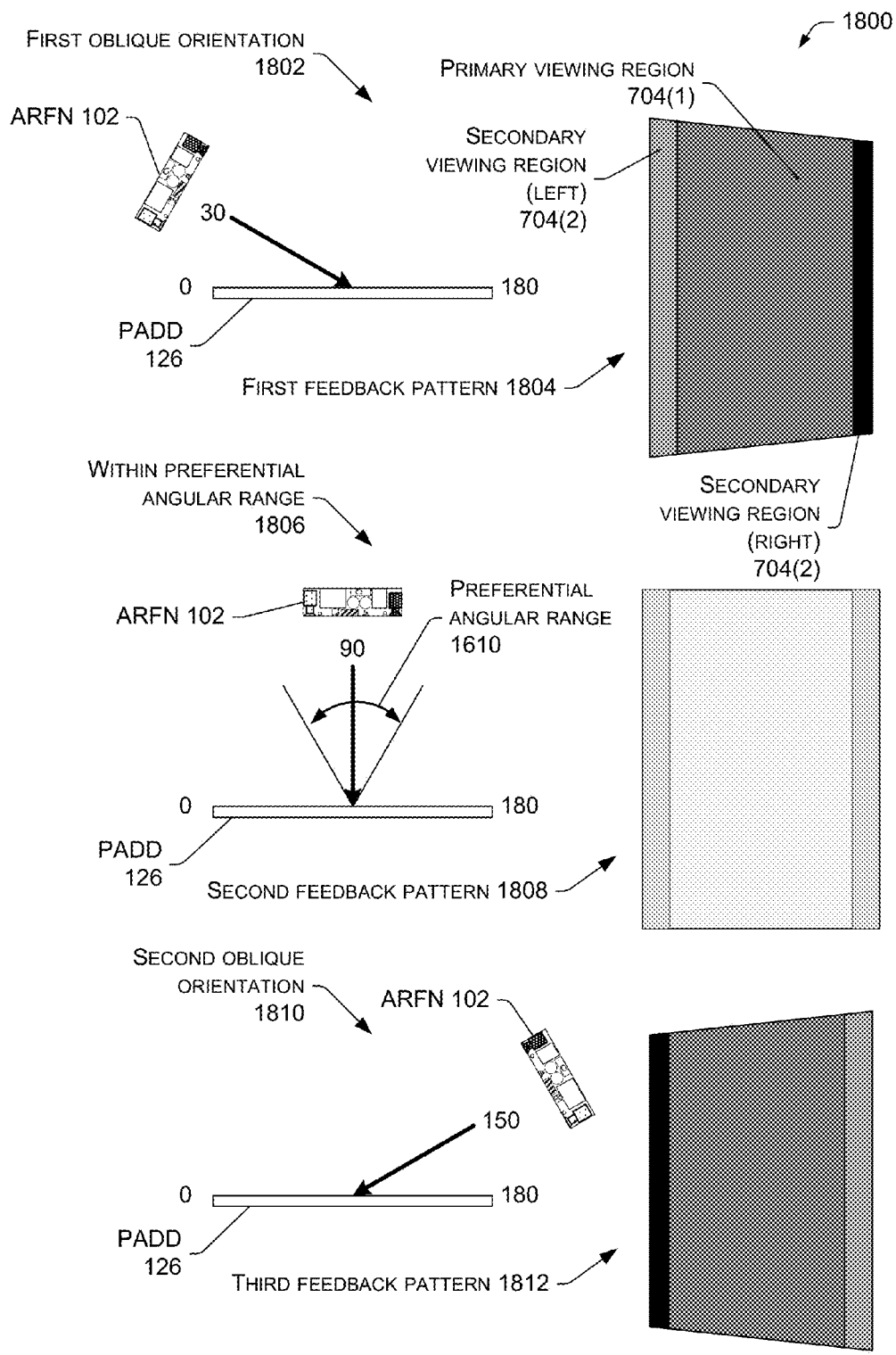
FIG. 18 is an illustrative scenario showing visual feedback to a user generated by the multiple viewing regions to aid in alignment of the PADD relative to an image projector.

FIG. 18 is an illustrative scenario 1800 showing visual feedback provided by the multiple viewing regions of FIGS. 15-16 to a user when the PADD 126 is oriented at different angles relative to the ARFN 102. The optical characteristics, such as the different reflectance response curves for each region, provide visual feedback to train the user to easily and intuitively orient the PADD 126 within the preferential angular range 1610, as easily as the user orients a book to take advantage of light from a bedside lamp.

A first oblique orientation of the PADD 126 relative to the ARFN 102 is shown at 1802. In this illustration, the relative angle between the projection surface 604 and the ARFN 102 is about 30 degrees. A corresponding first feedback pattern 1804 as viewed from the point of view of the ARFN 102 shows a distinctive pattern across the viewing regions. Specifically, the secondary viewing region 704(2) on the left reflects some light and thus appears as a medium shade of gray, the primary viewing region 704(1) reflects slightly less light and thus appears a darker shade of gray, and the secondary viewing region 704(2) on the right reflects the least incident light from the projector 206 and thus appears the darkest.

At 1806, the orientation of the device is moved such that the ARFN 102 is within the preferential angular range 1610 of the projection surface 604. As shown by the second feedback pattern 1808, the primary viewing region 704(1) is quite lighter in comparison to the first oblique orientation 1802 while the secondary viewing regions 704(2) on either side are equally a light gray.

A second oblique orientation 1810 illustrates when the relative angle between the projector 206 and the projection surface 604 continue to increase to about 150 degrees. In this illustration, a third feedback pattern 1812 appears as the opposite of the first feedback pattern 1804, providing a visual cue to the user to rotate the projection surface 604 to the right.

This feedback trains the user to easily and intuitively orient the PADD 126 within the preferential angular range 1610, as easily as they would orient a book to take advantage of light from a bedside lamp. By tilting the PADD 126 back and forth, the user is able to see the transition from one extreme to the other, thus providing an intuitive and quick way to encourage the preferred orientation.

In some implementations, the reflectance response curves 1606 and distribution of viewing regions 704 may be configured such that images, logos, text, or other features are visible at different relative angles. For example, the viewing regions 704 may be arranged such that a bullseye or "smiley face" appears when the PADD 126 is oriented with a relative angle between the projector 206 and the projection surface 604 which is within the preferential angular range 1610.

Figure 19:
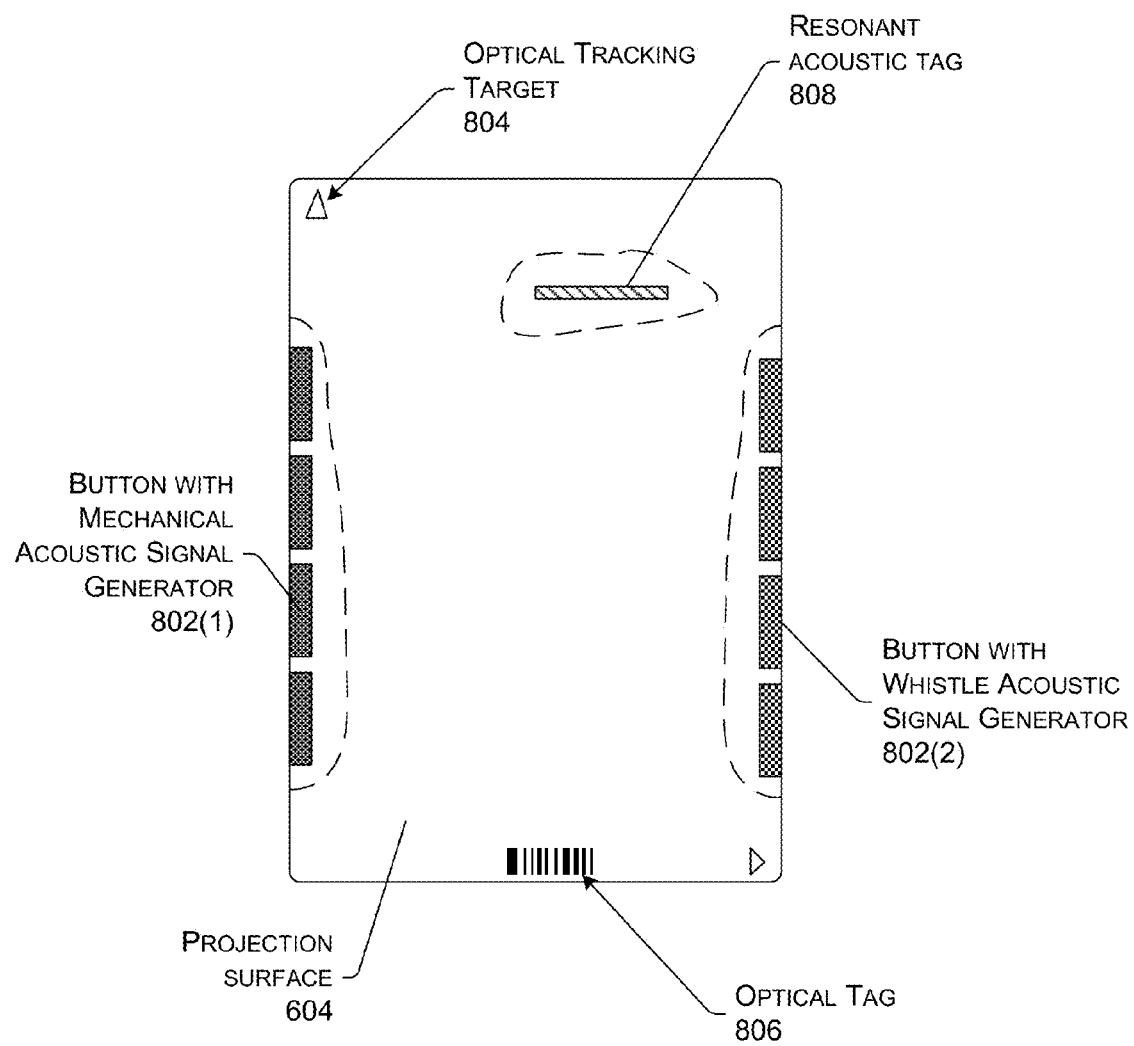
FIG. 19 is an illustrative PADD using passive components for identification, input, and so forth.

FIG. 19 is another illustrative PADD 1900 with cutaways to show internal details. In this implementation, passive components 606 such as a plurality of non-electronic buttons 802 are shown disposed on either side of the PADD 126. These may be buttons with mechanical acoustic signal generators 802(1), buttons with whistle acoustic signal generators 802(2), or a combination thereof. As described above, the tracking and control module 124 may be configured such that upon receiving the acoustic signal a particular command is executed. For example, pushing a particular non-electronic button 802 may result in changing the projected image to the next page of notes.

Also shown in this implementation is a pair of optical tracking targets 804 disposed in alternate corners of the projection surface 604. As described above, these one or more optical tracking targets 804 provide cues for the tracking and control module 124 to determine the location and orientation of the PADD 126. These optical tracking targets 804 include, but are not limited to, barcodes, pre-configured reflective targets, areas or patches with pre-determined color arrangements, and so forth.

An optical tag 806 in the form of a one dimensional barcode is shown in the bottom center of the projection surface 604. As described this optical tag 806 may encode a unique identifier for this particular PADD 126, allowing particular functions to be assigned to that PADD 126.

Figure 20:
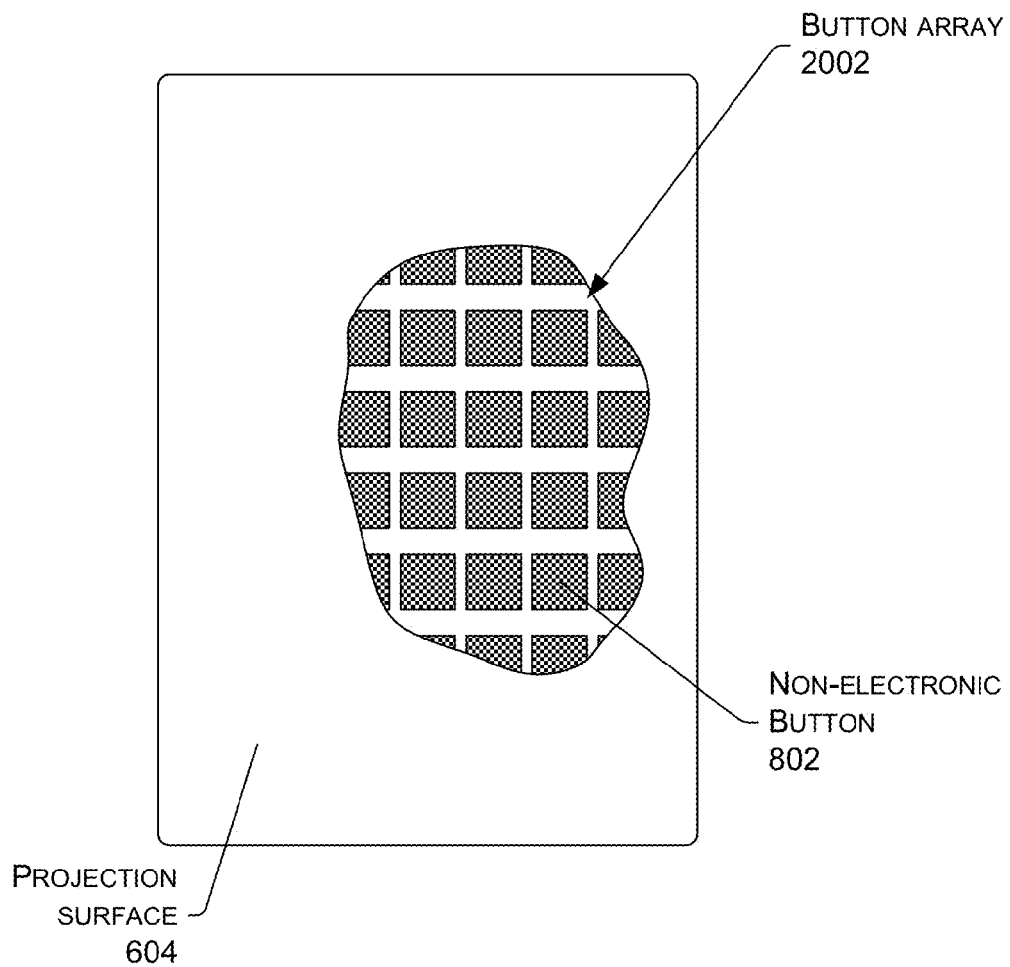
FIG. 20 is an illustrative PADD with an array of non-electric passive buttons to accept user input.

FIG. 20 is an illustrative PADD 2000 with a cutaway to show internal details. In this illustration, a plurality of the non-electric buttons 802 are disposed in a button array 2002 under the projection surface 604. The non-electronic buttons 802 may be distributed in a regular array, a keyboard array, keypad array, or other distributions suited for user input. The ARFN 102 may be configured to project indicia onto the projection surface 604 which correspond with particular non-electronic buttons 802. As described above, the non-electronic buttons 802 may be configured to generate an acoustic signal which is received by the ARFN 102 and interpreted as input by the tracking and control module 124.

Illustrative Active Configurations

Figure 21:
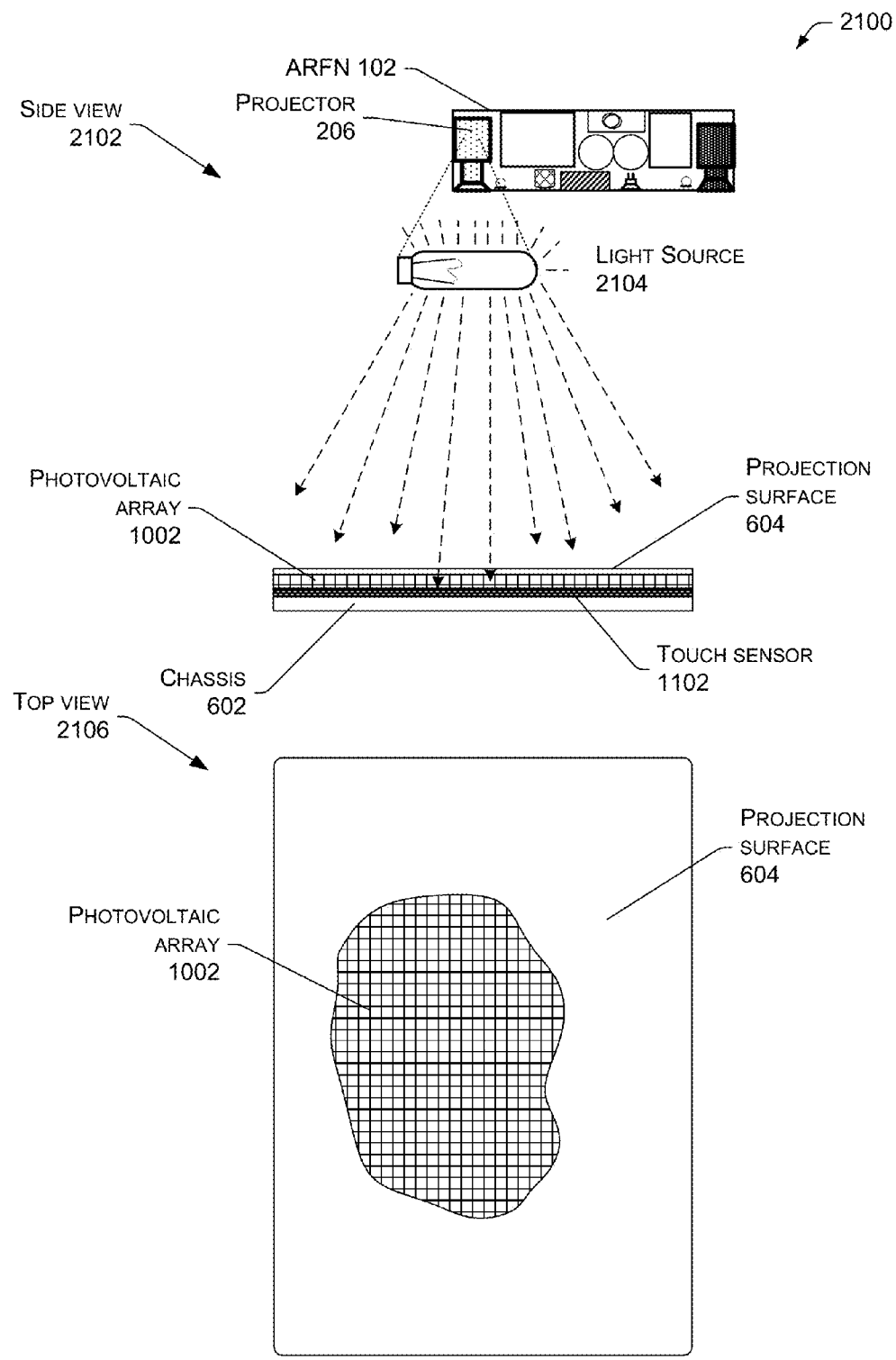
FIG. 21 is an illustrative PADD using active components including acquisition of electrical power from a photovoltaic array coupled to the projector of the ARFN.

FIG. 21 depicts several views of an illustrative PADD 2100 configured to receive energy from the projector 206. This energy is used to provide electric power for other active components 608 in the PADD 126.

A side view 2102 depicts a cross section of the PADD 126 revealing the projection surface 604, the photovoltaic array 1002, the touch sensor 1102, and the chassis 602. The projector 206 is configured with a light source 2104. The light source may comprise a lamp, light emitting diode, electroluminescent material, and so forth. The light source 2104 emits photons which are delivered via the mechanism of the projector 206 to the photovoltaic array 1002. These photons are then converted by the photovoltaic array 1002 into electrical power. The light source 2104 and the photovoltaic array 1002 may be tuned, such that the light source 2104 generates photons with energies complementary to the junctions within the photovoltaic array 1002 to maximize energy transfer. In other implementations, the photovoltaic array 1002 to utilize light from other lights sources, such as ambient room lighting.

The projection surface 604 may be configured to be transparent to the wavelengths which are used by the photovoltaic array 1002. In some implementations the photovoltaic array 1002 may be configured to act as the projection surface 604. A top view 2106 illustrates a cutaway of the projection surface 604, illustrating the photovoltaic array 1002 underneath. In some implementations the photovoltaic array 1002 may be exposed directly to the light source 2104. For example, the photovoltaic array 1002 may be distributed as an edging or band around a perimeter of the projection surface 604.

Figure 22:
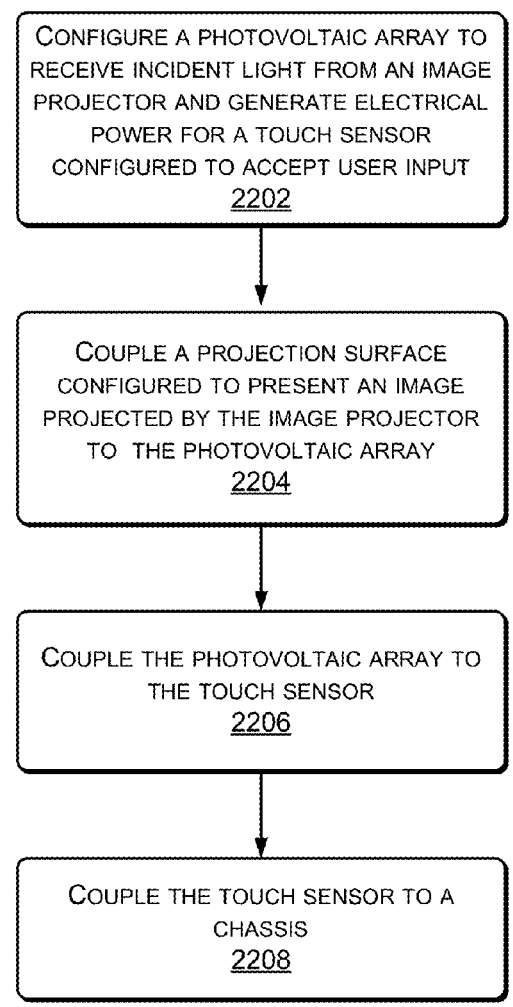
FIG. 22 is an illustrative process of assembling the PADD with a photovoltaic array and a touch sensor.

FIG. 22 is an illustrative process 2200 of assembling the PADD of FIG. 21 with the photovoltaic array 1002 and the touch sensor 1102. At 2202, the photovoltaic array 1002 is configured to receive incident light from the image projector 206 in the augmented reality environment and generate electrical power for the touch sensor 1102. The touch sensor 1102 is configured to accept user input. For example, the touch sensor 1102 may indicate user selection of virtual command buttons projected onto the PADD 126.

At 2204, the projection surface 604 configured to present an image projected by the image projector 206 in the augmented reality environment is coupled to the photovoltaic array 1002. The coupling may comprise lamination, adhesion, mechanical fastening, and so forth.

At 2206, the photovoltaic array 1002 is coupled to the touch sensor 1102. When present, other active components 608 may also be coupled to the photovoltaic array 1002 to receive electrical power. The coupling may comprise soldering, adhesion, contact by electrical conductors, inductive coupling, capacitive coupling, and so forth.

At 2208, the touch sensor 1102 is coupled to the chassis 602. As above, this coupling may comprise lamination, adhesion, mechanical fastening, and so forth.

Figure 23:
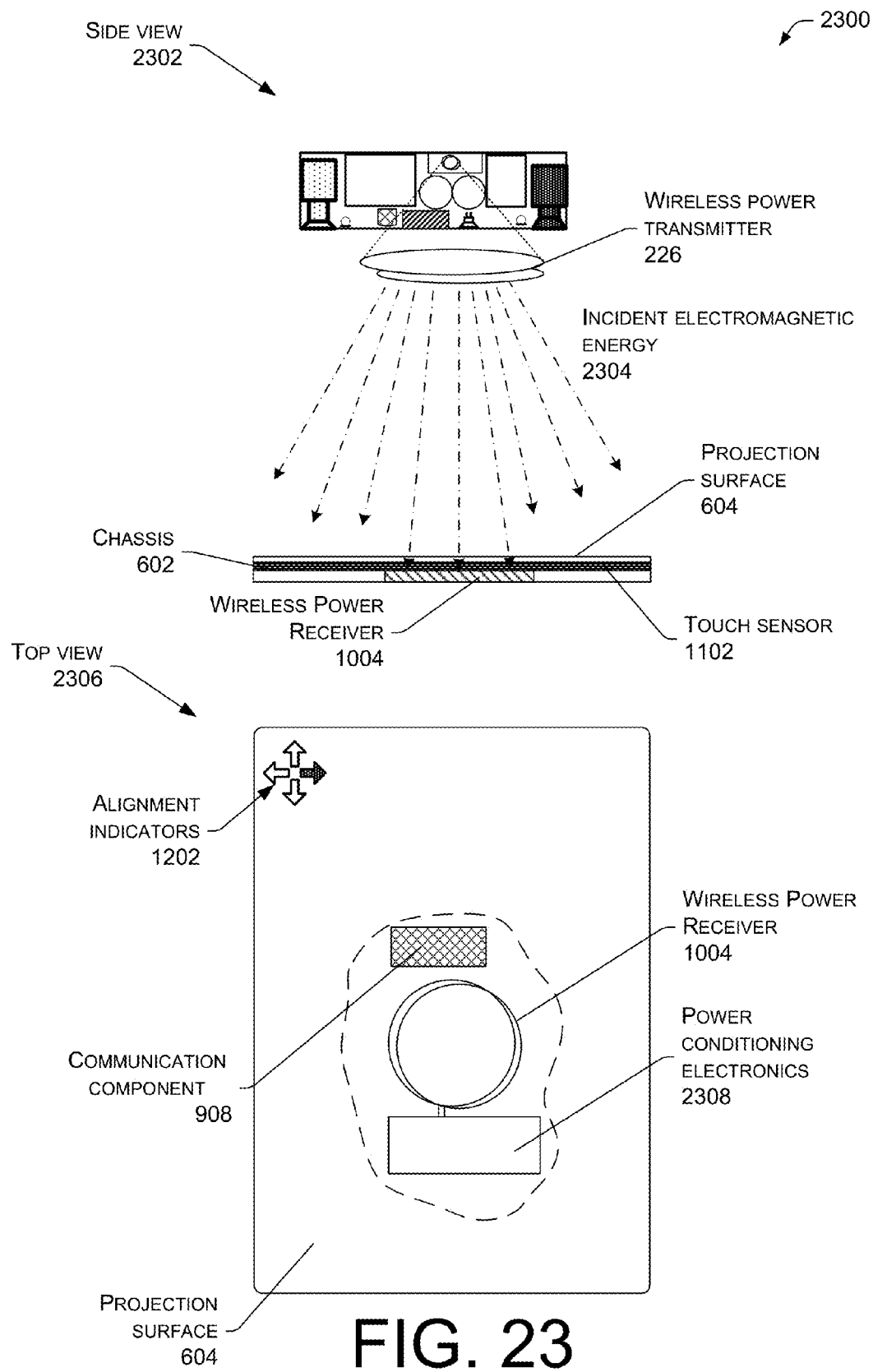
FIG. 23 is an illustrative PADD with a wireless power receiver active component and alignment indicators.

FIG. 23 is an illustrative PADD 2300 with the wireless power receiver 1004 and the alignment indicators 1202. A side view 2302 depicts a cross section of the PADD 126 revealing the projection surface 604, the touch sensor 1102, the wireless power receiver 1004, and the chassis 602. The ARFN 102 is configured with the wireless power transmitter 226. The wireless power transmitter 226 emits electromagnetic energy 2304 which may be harvested to produce electrical power by the wireless power receiver 1004 in the PADD 126 or other devices. In some implementations, the wireless power transmitter 226 may be separate from the ARFN 102, or multiple wireless power transmitters 226 may be placed around the scene. As mentioned above, in some implementations the wireless power receiver 1004 may be configured to recovery parasitic power instead of, or in addition to, energy from the wireless power transmitter 226.

The projection surface 604 may be configured to be transparent to the electromagnetic energy used during wireless power transfer. For example, the projection surface 604 may comprise a non-conducting plastic or ceramic which does not substantially impede electromagnetic fields.

A top view 2306 depicts the alignment indicators 1202 in a corner of the PADD 126. As described above, these alignment indicators 1202 may provide active cues to the user to maintain the orientation between the PADD 126 and the projector 206 within the preferential angular range. A communication component 908 shown within a cutaway of the PADD 126 may be used to exchange information with other devices, such as the ARFN 102. This information may be used to drive the alignment indicators 1202. For example, the ARFN 102 may detect the orientation of the PADD 126 and send alignment motion data to the PADD 126 for presentation via the alignment indicators 1202. Also shown within the cutaway is the wireless power receiver 1004 and the associated power conditioning electronics 2308 configured to provide electrical power suitable to the active devices in the PADD 126.

Figure 24:
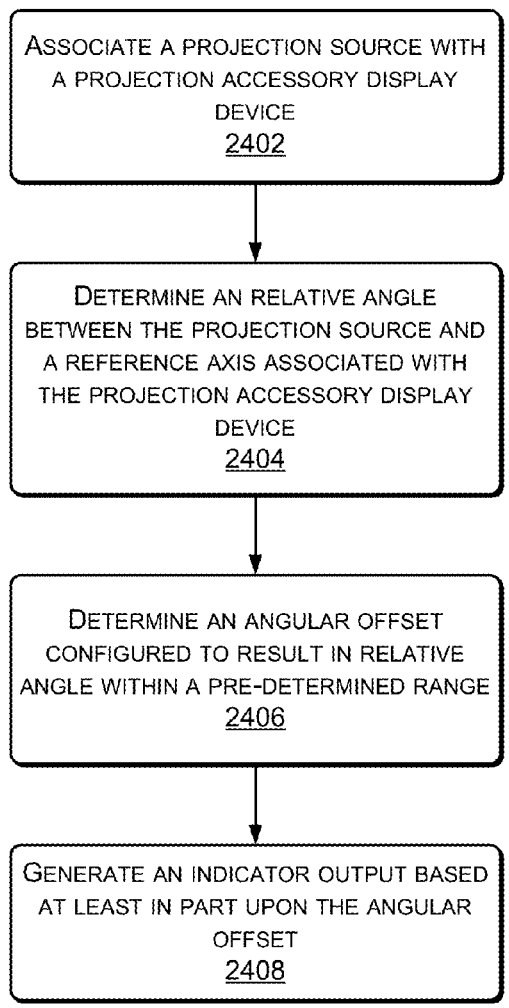
FIG. 24 is an illustrative process of generating alignment indicator output.

FIG. 24 is an illustrative process 2400 of generating alignment indicator output. This process may be performed by the tracking and control module 124, the alignment indicator 1202 component, or both.

At 2402, the projection source 206 is associated with the PADD 126. For example, in an augmented reality environment with multiple ARFNs 102, a particular ARFN 102 may be associated with the particular PADD 126 to generate images for the PADD 126. This association may dynamically change during operation, such as when the PADD is moved from one corner of the room to another.

At 2404, a relative angle is determined between the projection source and a reference axis associated with the PADD 126. For example, the reference axis may comprise a line perpendicular, or orthogonal, to the projection surface 604.

At 2406, an angular offset configured to result in a relative angle within the pre-determined preferential angular range is determined. For example, if the relative angle is 45 degrees and the preferential angular range is 60-120 degrees, the angular offset may be a minimum of 15 degrees, an optimum of 45 degrees, or a maximum of 75 degrees.

At 2408, an indicator output based at least in part upon the determined angular offset is generated. This indicator output may be conveyed via the alignment indicators 1202. In other implementations, the projector 206 may project an indicator onto the projection surface 604.

Figure 25:
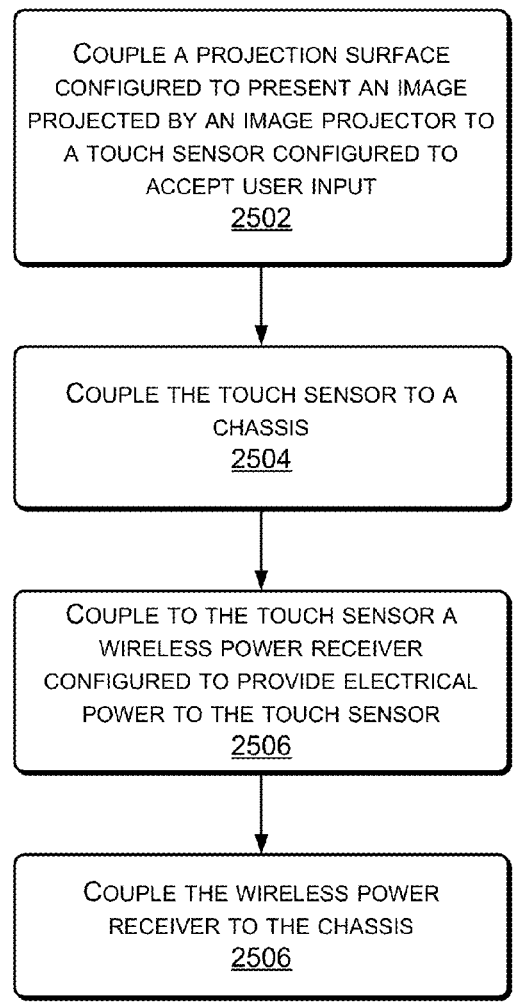
FIG. 25 is an illustrative process of assembling the PADD with a touch sensor and a wireless power receiver.

FIG. 25 is an illustrative process 2500 of assembling the PADD 126 with the wireless power receiver 1004 and the touch sensor 1102. At 2502, the projection surface 604 configured to present an image projected by the image projector 206 of the augmented reality environment is coupled to the touch sensor 1102. The touch sensor 1102 is configured to receive user input, such as user touches to select command buttons projected onto the projection surface 604. The coupling may comprise lamination, adhesion, mechanical fastening, deposition, and so forth.

At 2504, the touch sensor 1102 is coupled to the chassis 602. The coupling may comprise lamination, adhesion, mechanical fastening, and so forth.

At 2506, coupled to the touch sensor 1102 is the wireless power receiver 1004 that is configured to provide electrical power to the touch sensor 1102. When present, other active components 608 may also be coupled to the wireless power receiver 1004. The coupling may comprise soldering, adhesion, contact by electrical conductors, inductive coupling, capacitive coupling, and so forth.

At 2508, the wireless power receiver 1004 is coupled to the chassis 602. The coupling may comprise lamination, adhesion, mechanical fastening, and so forth.

Figure 26:
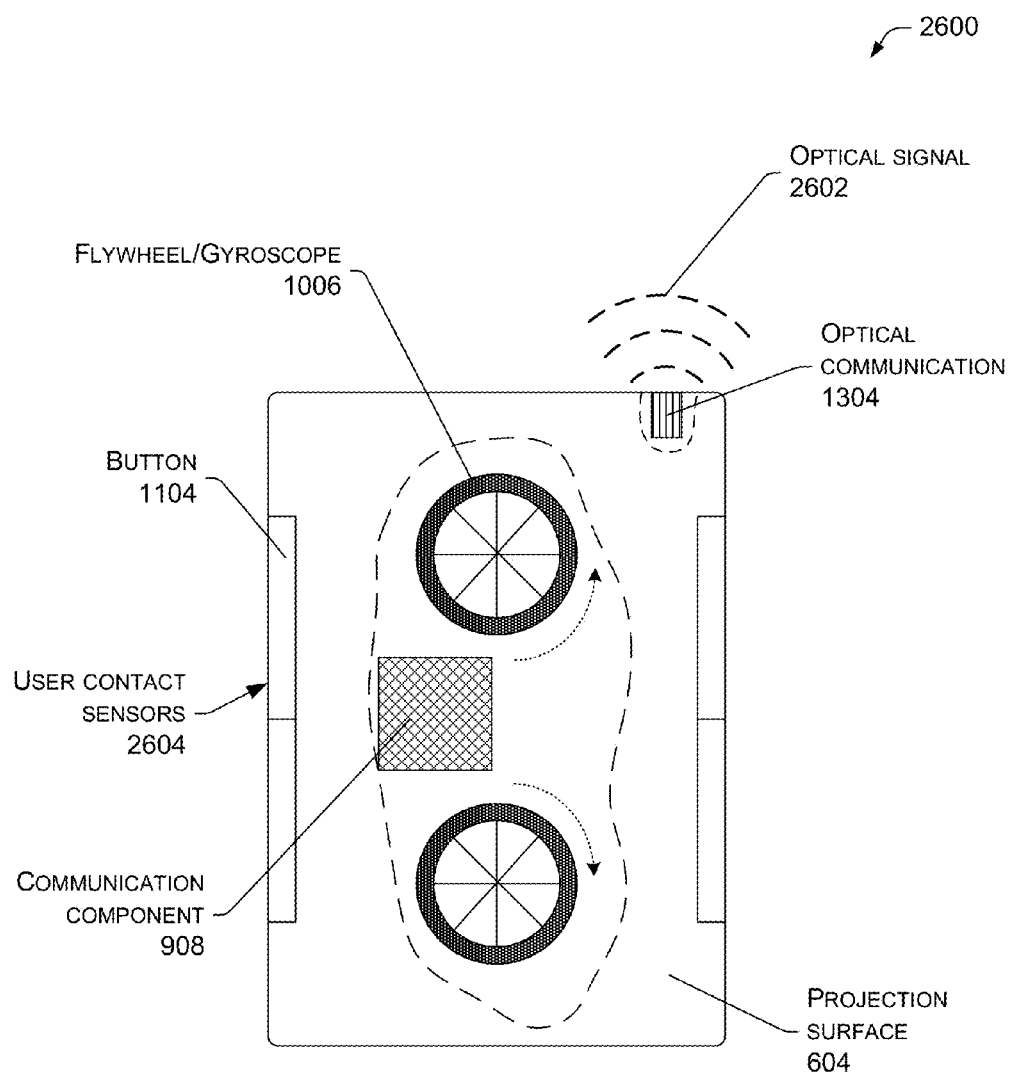
FIG. 26 is an illustrative PADD using active components including buttons, gyroscopes for stabilization, and optical communications.

FIG. 26 is another implementation 2600 of the PADD 126. A plurality of active buttons 1104 are disposed along the edges of the device, configured to accept user input. These buttons 1104 may couple to the communication component 908 shown in the cutaway view. Also shown within the cutaway are two flywheel/gyroscopes 1006 configured to rotate in opposing directions to minimize torque effects. As described above, these flywheel/gyroscopes 1006 may serve to stabilize the PADD 126, provide electrical power, and so forth.

The PADD 126 may also incorporate an optical communication component 1304. This optical communication component 1304 may comprise one or more LEDs, lasers, bulbs, or other light source configured to generate an optical signal 2602. The optical communication component 1304 may be configured to communicate with other devices, such as multimedia/audio-visual equipment such as televisions, DVD players, audio amplifiers, and so forth. Thus, the optical communication component 1304 in conjunction with the buttons 1104 may be configured to permit the PADD 126 to send remote-control signals to these other devices.

The PADD 126 may also incorporate user contact sensors 2604. These sensors may comprise conductive regions on the PADD 126. The user contact sensors 2604 are configured such that during typical use the user is in contact with one or more of the user contact sensors 2604. The user contact sensors 2604 may be coupled to the biomedical 1112 or biometric 1114 input components 904 to acquire biomedical or biometric information about the user. For example, the user contact sensors 2604 may be configured to detect the electrical signals from the user's heart so the biomedical 1112 sensors may determine the user's cardiac rhythm.

Figure 27:
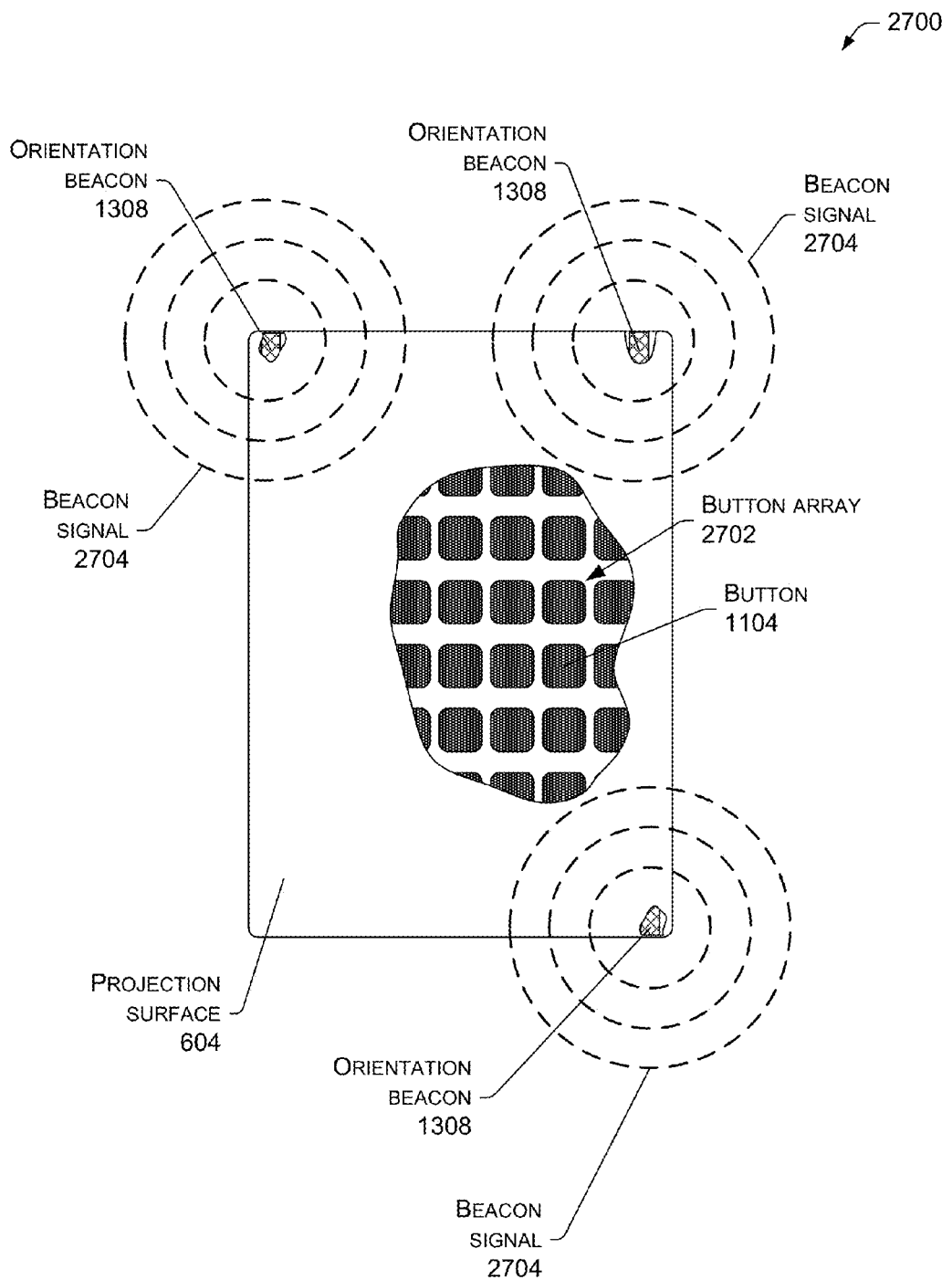
FIG. 27 is an illustrative PADD using active components including a button array and orientation beacons configured to cue the ARFN as to the orientation of the PADD within the environment.

FIG. 27 is another illustrative implementation 2700 of a PADD 126 configured with a plurality of active buttons 1104 disposed into a button array 2702 behind or under the projection surface 604. This button array 2702 may be used to accept user input. In some implementations, the projector 206 may project input indicia such as an image of a keyboard, keypad, command boxes, and so forth, onto the projection surface 604. In another implementation, a portion of the projection surface 604 may comprise pre-printed indicia.

Also shown are two orientation beacons 1308, each emplaced in opposing corners of the PADD 126. As described above, these orientation beacons 1308 provide additional cues about the location and orientation of the PADD 126 to the tracking and control module 124. These orientation beacons 1308 may generate beacon signals 2704 which are optical, acoustic, radio frequency electromagnetic, or a combination thereof. For example, the orientation beacons 1308 may comprise infrared LEDs which emit infrared light. The camera 210 may be configured to detect this infrared light and thus "sees" the corners of the device. The projection surface 604 may be configured to be transparent to the beacon signal 2704, permitting the orientation beacon 1308 to be concealed from the user.

Conclusion

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device for use in an augmented reality environment, the device comprising:
 a chassis;
 a projection surface coupled to the chassis and configured to accept a projected image from a remotely located augmented reality functional node that at least in part introduces an augmented reality into a scene, the projection surface comprising a primary viewing region having a first reflectance response curve and a secondary viewing region having a second reflectance response curve; and
 a passive component configured to be scanned by the augmented reality functional node.

2. The device of claim 1, wherein the first reflectance response curve is configured to reflect light incident at a pre-determined preferential angle relative to the projection surface more than light incident at a non-preferential angle.

3. The device of claim 1, wherein the second viewing region is disposed along at least a portion of a perimeter of the projection surface.

4. The device of claim 1, wherein the projection surface further comprises a watermark.

5. The device of claim 4, wherein the watermark encodes a pseudorandom noise pattern and is configured to be imaged with a non-visible wavelength of light.

6. The device of claim 1, wherein the passive component comprises a non-electronic button configured to generate an acoustic signal upon activation.

7. The device of claim 6, wherein the acoustic signal is ultrasonic.

8. The device of claim 1, wherein the passive component comprises an optical tracking target configured to provide orientation cues to the augmented reality functional node.

9. The device of claim 1, wherein the passive component comprises an optical tag storing an identifier of the device.

10. The device of claim 1, wherein the passive component comprises a resonant acoustic tag configured to accept acoustic energy and emit an acoustic signal.

11. The device of claim 1, wherein the device is embodied as a table top or countertop.

12. A device comprising:
 a projection surface in an augmented reality environment, the projection surface configured to present a projected image from a remote projector, the projection surface comprising a plurality of viewing regions having differing pre-defined reflectance response characteristics; and
 a chassis configured to support the projection surface.

13. The device of claim 12, wherein the plurality of viewing regions are configured such that when the projection surface is within a pre-determined orientation relative to the projected image projected by the remote projector, a visual feedback pattern resulting from the interaction of the projected image and the differing pre-defined reflectance response characteristics is presented.

14. The device of claim 12, wherein the plurality of viewing regions are configured such that when a relative angle between the projection surface and the remote projector exceeds a pre-determined preferential angular range, a visual feedback pattern resulting from the interaction of the projected image and the differing pre-defined reflectance response characteristics is presented.

15. The device of claim 12, wherein the pre-determined preferential angular range is within about 30 degrees of a perpendicular of the projection surface.

16. The device of claim 12, wherein the reflectance response characteristics of at least one of the plurality of viewing regions is configured to preferentially reflect light incident within a pre-determined preferential angular range relative to the projection surface.

17. The device of claim 12, wherein the reflectance response characteristics of at least one of the plurality of viewing regions is configured to preferentially scatter or absorb incident light outside of a pre-determined preferential angular range relative to the projection surface.

18. The device of claim 12, further comprising a non-electronic button configured to, upon activation, generate an ultrasonic acoustic signal suitable for communication with an augmented reality functional node.

19. The device of claim 18, further comprising a plurality of non-electronic buttons, each configured to generate a distinctive ultrasonic acoustic signal upon activation.

20. A device comprising:
 a projection surface configured to present a projected image from a projector that is remote from the projection surface, the projection surface comprising a plurality of viewing regions having differing pre-defined reflectance response characteristics; and a chassis configured to support the projection surface.

21. The device of claim 20, wherein the plurality of viewing regions are configured such that when the projection surface is within a pre-determined orientation relative to the projected image projected by the remote projector, a visual feedback pattern resulting from the interaction of the projected image and the differing pre-defined reflectance response characteristics is presented.

22. The device of claim 20, wherein the plurality of viewing regions are configured such that when a relative angle between the projection surface and the projector exceeds a pre-determined preferential angular range, a visual feedback pattern resulting from the interaction of the projected image and the differing pre-defined reflectance response characteristics is presented.

23. The device of claim 20, wherein the pre-determined preferential angular range is within about 30 degrees of a perpendicular of the projection surface.

24. The device of claim 20, wherein the reflectance response characteristics of at least one of the plurality of viewing regions is configured to preferentially reflect light incident within a pre-determined preferential angular range relative to the projection surface.

25. The device of claim 20, wherein the reflectance response characteristics of at least one of the plurality of viewing regions is configured to preferentially scatter or absorb incident light outside of a pre-determined preferential angular range relative to the projection surface.

26. The device of claim 20, further comprising a non-electronic button configured to generate an ultrasonic acoustic signal.

27. The device of claim 26, further comprising a plurality of non-electronic buttons, each configured to generate a distinctive ultrasonic acoustic signal.

28. A device comprising:

a chassis;

a projection surface coupled to the chassis and configured to receive an image projected by a projector that is remote from the device, the projection surface comprising a primary viewing region having a first reflectance response curve and a secondary viewing region having a second reflectance response curve; and a passive component configured to be scanned by a camera that is remote from the device.

29. The device of claim 28, wherein the first reflectance response curve is configured to reflect light incident at a pre-determined preferential angle relative to the projection surface more than light incident at a non-preferential angle.

* * * * *